United States Patent
Liu et al.

(10) Patent No.: US 11,405,858 B2
(45) Date of Patent: *Aug. 2, 2022

(54) WIRELESS ACCESS METHOD AND APPARATUS, COMMUNICATIONS SYSTEM, AND TERMINAL

(71) Applicant: Huawei Technologies Co., Ltd., Shenzhen (CN)

(72) Inventors: Kunpeng Liu, Beijing (CN); Yongxing Zhou, Beijing (CN); Leiming Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 8 days.

This patent is subject to a terminal disclaimer.

(21) Appl. No.: 16/997,431

(22) Filed: Aug. 19, 2020

(65) Prior Publication Data

US 2020/0389840 A1 Dec. 10, 2020

Related U.S. Application Data

(63) Continuation of application No. 15/716,763, filed on Sep. 27, 2017, now Pat. No. 10,791,504, which is a (Continued)

(51) Int. Cl.
*H04W 48/16* (2009.01)
*H04W 74/08* (2009.01)
*H04W 56/00* (2009.01)

(52) U.S. Cl.
CPC ....... *H04W 48/16* (2013.01); *H04W 74/0833* (2013.01); *H04W 56/001* (2013.01)

(58) Field of Classification Search
CPC .......................... H04W 48/16; H04W 74/0833
(Continued)

(56) References Cited

U.S. PATENT DOCUMENTS

2009/0274129 A1 11/2009 Ponnuswamy
2010/0323710 A1 12/2010 Chen
(Continued)

FOREIGN PATENT DOCUMENTS

CN 103780357 A 5/2014
CN 103812546 A 5/2014
(Continued)

OTHER PUBLICATIONS

"3rd Generation Partnership Project; Technical Specification Group Radio Access Network; Evolved Universal Terrestrial Radio Access (E-UTRA); Physical Layer Procedures (Release 11)," 3GPP TS 36.213 V11.10.0, Mar. 2015, 182 pages.

*Primary Examiner* — Candal Elpenord
(74) *Attorney, Agent, or Firm* — Slater Matsil, LLP

(57) ABSTRACT

A wireless access method and apparatus, the method including sending N first signal sets on N first resources, where N is an integer greater than 1, receiving Z response signals from a terminal for the N first signal sets, where each response signal of the response signals comprises indication information of a resource on which the respective first signal set of the N first signal sets is located, Z is an integer greater than or equal to 1, and Z is less than or equal to N, and sending M second signal sets on M second resources according to the Z response signals, where M is an integer greater than or equal to 1, and each second signal set of the M second signal sets corresponds to at least one of the N first signal sets.

34 Claims, 15 Drawing Sheets

Related U.S. Application Data continuation of application No. PCT/CN2015/075340, filed on Mar. 28, 2015.

(58) Field of Classification Search
USPC .................................................. 370/329–330
See application file for complete search history.

(56) References Cited

U.S. PATENT DOCUMENTS

| | | |
|---|---|---|
| 2011/0269492 A1 | 11/2011 | Wang |
| 2012/0322447 A1 | 12/2012 | Ramachandran et al. |
| 2013/0237218 A1 | 9/2013 | Li et al. |
| 2013/0301567 A1 | 11/2013 | Jeong et al. |
| 2014/0016488 A1 | 1/2014 | Xu et al. |
| 2014/0086112 A1 | 3/2014 | Stern-Berkowitz et al. |
| 2014/0177607 A1 | 6/2014 | Li et al. |
| 2014/0185575 A1 | 7/2014 | Morioka |
| 2014/0321375 A1 | 10/2014 | Agiwal et al. |
| 2015/0208443 A1 | 7/2015 | Jung et al. |
| 2016/0197659 A1 | 7/2016 | Yu et al. |
| 2016/0234736 A1 | 8/2016 | Kubota et al. |
| 2016/0241322 A1* | 8/2016 | Son .................... H04B 7/0695 |

FOREIGN PATENT DOCUMENTS

| | | |
|---|---|---|
| CN | 104471991 A | 3/2015 |
| EP | 2887558 A1 | 6/2015 |
| KR | 20140023690 A | 2/2014 |
| WO | 2014027868 A1 | 2/2014 |
| WO | 2014071852 A1 | 5/2014 |

\* cited by examiner

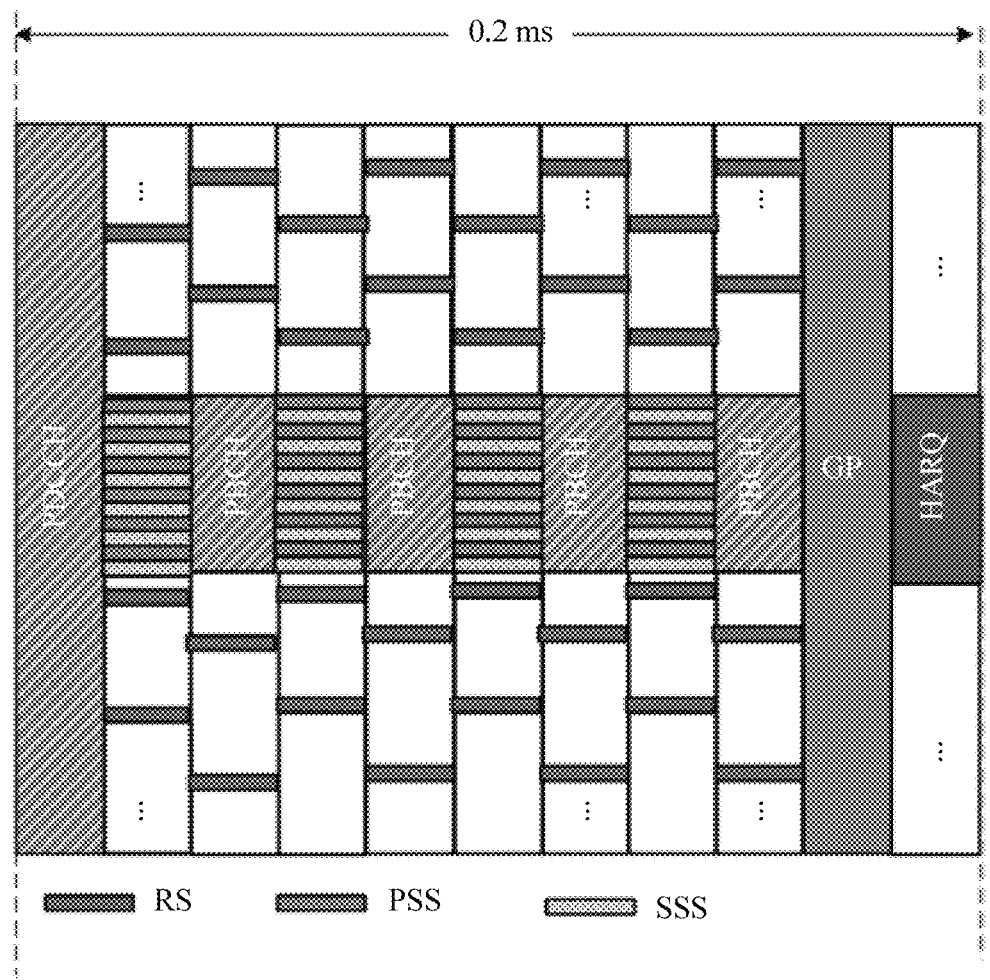

FROM

WIRELESS ACCESS METHOD AND APPARATUS, COMMUNICATIONS SYSTEM, AND TERMINAL

CROSS-REFERENCE TO RELATED APPLICATIONS

This application is a continuation of U.S. application Ser. No. 15/716,763, filed on Sep. 27, 2017, which is a continuation of International Application No. PCT/CN2015/075340, filed on Mar. 28, 2015. All of the afore-mentioned patent applications are hereby incorporated by reference in their entireties.

TECHNICAL FIELD

The present invention relates to the field of communications technologies, and in particular, to a wireless access method and apparatus, a communications system, and a terminal.

BACKGROUND

In a low-frequency scenario, a beam of each antenna port is a wide beam shown in FIG. 1. Therefore, users in an entire cell can be covered, and a good coverage effect can be achieved when a broadcast channel, system information, paging, and the like may be transmitted by using a wide beam. However, in a high-frequency scenario, a path loss increases. Therefore, a beamforming technology of massive multiple-input multiple-output (massive MIMO) needs to be used to generate a very high antenna gain, so as to compensate the path loss. In the massive MIMO, there are many antennas, or even hundreds of antennas. When a large antenna gain is generated, a formed beam is very narrow, and a narrow beam cannot cover all users in a cell. For example, in FIG. 2a, a formed beam can cover only user equipment (UE) 1, but cannot cover UE2. Therefore, a beam cannot cover all user equipments in a cell. User equipment cannot access a network in a timely manner.

It is an urgent problem to be resolved that user equipment in narrow beam transmission cannot access a network in a timely manner.

SUMMARY

Embodiments of the present invention provide a wireless access method and apparatus, a communications system, and a terminal, so that user equipment in narrow beam transmission can access a network in a timely manner.

According to a first aspect, a wireless access method is provided, including sending, by a first wireless network device, N first signal sets on N first resources, where N is an integer greater than 1, receiving, by the first wireless network device, Z response signals fed back by a second wireless network device for the N first signal sets, where each response signal includes indication information of a resource on which the first signal set is located, Z is an integer greater than or equal to 1, and Z is less than or equal to N, and sending, by the first wireless network device, M second signal sets on M second resources according to the Z response signals, where M is an integer greater than or equal to 1, and each of the M second signal sets is corresponding to at least one of the N first signal sets.

The resource on which the first signal set is located includes at least one of a time resource, a frequency resource, a code resource, or a space resource.

The time resource may include a relative time resource, for example, at least one of a radio frame number, a relative location of a subframe in a radio frame, or a relative location of a symbol in a subframe.

First signal sets are sent on multiple resources, so that more second wireless network devices can establish synchronization with the first wireless network device in a timely manner. A second signal set is sent according to a response signal fed back by the second wireless network device for the first signal set, so that the second wireless network device can access the first wireless network device in a timely manner after synchronization, and the second signal set can be sent more effectively, thereby saving a second resource, and avoiding interference caused when the second signal set is sent on an invalid second resource.

In a first possible implementation of the first aspect, the first signal set at least includes a synchronization signal, and the second signal set at least includes system information.

With reference to the first aspect or the first possible implementation of the first aspect, in a second possible implementation of the first aspect, Z is variable.

With reference to any one of the first aspect, or the first or the second possible implementation of the first aspect, in a third possible implementation of the first aspect, M is variable.

With reference to any one of the first aspect, or the first to the third possible implementations of the first aspect, in a fourth possible implementation of the first aspect, N is constant, and the N first resources are corresponding to coverage of one area.

The area may be a cell. In this way, all second wireless network devices covered by the cell can establish synchronization in a timely manner, so that all the second wireless network devices in the cell can access the first wireless network device in a timely manner.

With reference to any one of the first aspect, or the first to the fourth possible implementations of the first aspect, in a fifth possible implementation of the first aspect, a set of the first signal set and the second signal set includes all configuration signals required when the second wireless network device and the first wireless network device establish a wireless connection.

With reference to any one of the first aspect, or the first to the fifth possible implementations of the first aspect, in a sixth possible implementation of the first aspect, a data size of the first signal set is less than a data size of the second signal set.

In this way, most configuration signals used when the second wireless network device accesses the first wireless network device are sent in the second signal set, thereby reducing system signaling overheads, and further reducing power overheads and energy overheads of the first wireless network device.

With reference to any one of the first aspect, or the first to the sixth possible implementations of the first aspect, in a seventh possible implementation of the first aspect, the first resource includes a first space resource, and the second resource includes a second space resource.

With reference to any one of the first aspect, or the first to the seventh possible implementations of the first aspect, in an eighth possible implementation of the first aspect, the first resource includes a first time resource, and the second resource includes a second time resource, where N first time resources are used to send first signal sets corresponding to N first space resources, and M second time resources are used to send second signal sets corresponding to M second space resources.

With reference to any one of the first aspect, or the first to the eighth possible implementations of the first aspect, in a ninth possible implementation of the first aspect, M is less than N.

With reference to any one of the first to the ninth possible implementations of the first aspect, in a tenth possible implementation of the first aspect, each second signal set further includes a second synchronization signal and a second broadcast signal, or the first signal set further includes a first measurement pilot signal, and the second signal set further includes a second synchronization signal and a second broadcast signal, or the first signal set further includes a first measurement pilot signal, and the second signal set further includes a second synchronization signal, a second broadcast signal, and a second measurement pilot signal, or the first signal set further includes a first measurement pilot signal and a first broadcast signal, and the second signal set further includes a second synchronization signal and a second broadcast signal, or the first signal set further includes a first measurement pilot signal and a first broadcast signal, and the second signal set further includes a second synchronization signal, a second broadcast signal, and a second measurement pilot signal.

With reference to any one of the first aspect, or the first to the tenth possible implementations of the first aspect, in an eleventh possible implementation of the first aspect, the second signal set is different from the first signal set corresponding to the second signal set.

In this way, the first signal set is different from the second signal set, so that the second wireless network device can determine, before sending a response signal, that the first signal set is received.

With reference to the eleventh possible implementation of the first aspect, in a twelfth possible implementation of the first aspect, that the second signal set is different from the first signal set corresponding to the second signal set includes a second signal in the second signal set is different from a first signal in the first signal set corresponding to the second signal set, and the first signal and the second signal have a same function type.

With reference to the twelfth possible implementation of the first aspect, in a thirteenth possible implementation of the first aspect, that a second signal in the second signal set is different from a first signal in the first signal set corresponding to the second signal set, and the first signal and the second signal have a same function type includes that the second signal is different from the first signal in at least one of a data size, a used time resource, a used frequency resource, or a used code resource, and the first signal and the second signal have a same function type.

With reference to either of the twelfth and the thirteenth possible implementations of the first aspect, in a fourteenth possible implementation of the first aspect, the first signal and the second signal that have a same function type are a first synchronization signal and a second synchronization signal, and sequences of the first synchronization signal and the second synchronization signal are different, or a first synchronization signal includes a first primary synchronization signal and a first secondary synchronization signal, a second synchronization signal includes a second primary synchronization signal and a second secondary synchronization signal, and an intersymbol spacing between the first primary synchronization signal and the first secondary synchronization signal is different from an intersymbol spacing between the second primary synchronization signal and the second secondary synchronization signal.

In this way, the second network device can determine, by detecting a difference between the first synchronization signal and the second synchronization signal, whether to send a response signal.

With reference to either of the thirteenth and the fourteenth possible implementations of the first aspect, in a fifteenth possible implementation of the first aspect, the first signal and the second signal that have a same function type are a first broadcast signal and a second broadcast signal, and a difference between the first broadcast signal and the second broadcast signal includes that data packet sizes are different, or data packet sizes are the same, but carried information is different, or data packet sizes are the same, and carried information is the same, but used scrambling codes are different, or data packet sizes are the same, and carried information is the same, but masks scrambling cyclic redundancy check (CRC) codes of data packets are different, or sizes of time-frequency resources used for transmission are different.

In this way, the second wireless network device can determine, by detecting a difference between the first broadcast signal and the second broadcast signal, whether to send a response signal.

With reference to any one of the first aspect, or the first to the fifteenth possible implementations of the first aspect, in a sixteenth possible implementation of the first aspect, first signals that have a same function type in the N first signal sets are different from each other.

In this way, the first signal set can carry outer-loop beam information, and the second wireless network device can feed back, according to a received first signal set, a response signal corresponding to the first signal set.

With reference to the sixteenth possible implementation of the first aspect, in a seventeenth possible implementation of the first aspect, that first signals that have a same function type in the N first signal sets are different from each other includes that locations of at least one of time resources in a frame structure, frequency resources, or code resources separately used by the first signals that have a same function type in the N first signal sets are different.

With reference to the seventeenth possible implementation of the first aspect, in an eighteenth possible implementation of the first aspect, the first signal is the first synchronization signal, or the first broadcast signal.

With reference to any one of the first aspect, or the first to the eighteenth possible implementations of the first aspect, in a nineteenth possible implementation of the first aspect, a period T1 of sending a first signal in the N first signal sets is longer than or equal to a period T2 of sending a second signal in the M second signal sets, and the first signal and the second signal have a same function type.

In this way, the system signaling overheads, the energy overheads, and the power overheads can be further reduced.

With reference to the nineteenth possible implementation of the first aspect, in a twentieth possible implementation of the first aspect, within the period T1 of sending the first signal in the first signal set, the first signal in the N first signal sets is sent in at least one contiguous radio frame.

With reference to the nineteenth or the twentieth possible implementation of the first aspect, in a twenty-first possible implementation of the first aspect, within the period T1 of sending the first signal in the first signal set, only one first signal is sent in each radio frame, or at least two first signals are sent in each radio frame.

With reference to any one of the first aspect, or the first to the twenty-first possible implementations of the first aspect, in a twenty-second possible implementation of the first aspect, the first signal set is sent in a dedicated subframe in a radio frame, and each dedicated subframe includes at least two first signal sets, where different first signal sets occupy different symbols, and a beam switch interval exists between the symbols occupied by the different first signal sets, and/or a same first signal set occupies a same beam time domain, and the same beam time domain is determined by using two adjacent beam switch intervals.

In this way, the same first signal set is sent in one beam time domain, so that the second wireless network device can obtain a corresponding configuration signal by scanning a round of (N) outer-loop beams, and can initiate random access as soon as possible after receiving a second beam signal.

With reference to the twenty-second possible implementation of the first aspect, in a twenty-third possible implementation of the first aspect, that a same first signal set occupies a same beam time domain includes first signals that have different function types in the same first signal set occupy different symbols in the same beam time domain, or first signals that have different function types in the same first signal set occupy a same symbol in the same beam time domain, and occupy different frequency resources.

With reference to any one of the nineteenth to the twenty-third possible implementations of the first aspect, in a twenty-fourth possible implementation of the first aspect, within the period T1 of sending the first signal in the first signal set, a maximum of one second signal is sent in each radio frame, and the first signal and the second signal have a same function type.

With reference to any one of the first aspect, or the first to the twenty-fourth possible implementations of the first aspect, in a twenty-fifth possible implementation of the first aspect, that each response signal includes indication information of a resource on which the first signal set is located includes a resource used by each response signal is determined according to a resource used by at least one first signal in the first signal set, where the resource used by each response signal includes at least one of a time resource, a frequency resource, or a code resource, and the resource used by the first signal includes at least one of the time resource, the frequency resource, or the code resource.

With reference to any one of the first aspect, or the first to the twenty-fifth possible implementations of the first aspect, in a twenty-sixth possible implementation of the first aspect, the Z response signals are different from each other.

With reference to the twenty-sixth possible implementation of the first aspect, in a twenty-seventh possible implementation of the first aspect, that the Z response signals are different from each other includes time resources, frequency resources, or code resources separately used by the Z response signals are different.

With reference to any one of the first aspect, or the first to the twenty-seventh possible implementations of the first aspect, in a twenty-eighth possible implementation of the first aspect, locations of the time resources used by the Z response signals are fixed or changeable in the frame structure.

With reference to any one of the first aspect, or the first to the twenty-eighth possible implementations of the first aspect, in a twenty-ninth possible implementation of the first aspect, the resource used by each response signal is associated with a corresponding first signal set.

With reference to the twenty-ninth possible implementation of the first aspect, in a thirtieth possible implementation of the first aspect, that the resource used by each response signal is associated with a corresponding first signal set includes a time resource used by each response signal is associated with at least one of a time resource, a frequency resource, or a code resource of the corresponding first signal set, and/or a frequency resource used by each response signal is associated with at least one of a time resource, a frequency resource, or a code resource of the corresponding first signal set, and/or a space resource used by each response signal is associated with at least one of a time resource, a frequency resource, or a code resource of the corresponding first signal set.

With reference to any one of the first aspect, or the first to the thirtieth possible implementations of the first aspect, in a thirty-first possible implementation of the first aspect, a response signal that is fed back when the second wireless network device is in an idle mode is different from a response signal that is fed back when the second wireless network device is in a connected mode.

In this way, the first wireless network device can determine, according to a received response signal fed back by the second wireless network device for an outer-loop beam, a period of sending a second signal set in a corresponding inner-loop beam.

With reference to the thirty-first possible implementation of the first aspect, in a thirty-second possible implementation of the first aspect, that a response signal that is fed back when the second wireless network device is in an idle mode is different from a response signal that is fed back when the second wireless network device is in a connected mode includes used sequences are different.

With reference to any one of the first aspect, or the first to the thirty-second possible implementations of the first aspect, in a thirty-third possible implementation of the first aspect, when the M second resources include the M second time resources, a location of each second time resource is fixed or changeable in the frame structure.

With reference to the thirty-third possible implementation of the first aspect, in a thirty-fourth possible implementation of the first aspect, when the location of each second time resource is changeable in the frame structure, the first wireless network device notifies the second wireless network device of each second time resource by using a corresponding first signal set.

With reference to any one of the first aspect, or the first to the thirty-fourth possible implementations of the first aspect, in a thirty-fifth possible implementation of the first aspect, the Z response signals are fed back after the second wireless network device determines that the corresponding first signal set meets a feedback condition.

With reference to the thirty-fifth possible implementation of the first aspect, in a thirty-sixth possible implementation of the first aspect, the feedback condition includes when the first signal set at least includes a first synchronization signal, a peak of the first synchronization signal in the first signal set exceeds a preset threshold, or when the first signal set at least includes a first synchronization signal and the first measurement pilot signal, a peak of the first synchronization signal exceeds a preset threshold, and an RSRP of the first measurement pilot signal exceeds a preset threshold, or when the first signal set at least includes a first synchronization signal, the first measurement pilot signal, and the first broadcast signal, a peak of the first synchronization signal exceeds a preset threshold, an RSRP of the first measurement pilot signal exceeds a preset threshold, and the first broadcast signal is correctly demodulated.

In this way, a feedback condition of a response signal is set, so that it can be ensured that the second wireless network device performs a feedback only on a beam with a guaranteed communication effect, and in addition, interference caused by an invalid response signal can be avoided.

With reference to any one of the first aspect, or the first to the thirty-sixth possible implementations of the first aspect, in a thirty-seventh possible implementation of the first aspect, within a period of time, when the second wireless network device determines that R first signal sets meet the feedback condition, and R is an integer greater than 1, the second wireless network device performs a response feedback on at least one of the R first signal sets.

With reference to the thirty-seventh possible implementation of the first aspect, in a thirty-eighth possible implementation of the first aspect, the at least one of the R first signal sets is one optimal first signal set or W preferable first signal sets, and W is an integer greater than 1 and less than R.

With reference to any one of the first aspect, or the first to the thirty-eighth possible implementations of the first aspect, in a thirty-ninth possible implementation of the first aspect, each response signal and a first signal set that is corresponding to the response signal are located in a same subframe or radio frame.

With reference to any one of the first aspect, or the first to the thirty-ninth possible implementations of the first aspect, in a fortieth possible implementation of the first aspect, within the period T1 of sending the first signal set, radio frames used by the Z response signals are after radio frames used by the N first signal sets.

With reference to any one of the first aspect, or the first to the fortieth possible implementations of the first aspect, in a forty-first possible implementation of the first aspect, relative locations of subframes occupied in different radio frames by the second signal in the second signal set and the first signal in the first signal set are the same, the second signal set is corresponding to the first signal set, and the second signal and the first signal have a same function type.

With reference to any one of the first aspect, or the first to the forty-first possible implementations of the first aspect, in a forty-second possible implementation of the first aspect, relative locations of symbols occupied in different subframes by the second signal in the second signal set and the first signal in the first signal set are the same, the second signal set is corresponding to the first signal set, and the second signal and the first signal have a same function type.

With reference to any one of the first to the forty-second possible implementations of the first aspect, in a forty-third possible implementation of the first aspect, each response signal is sent at a scheduled time according to a downlink of the first synchronization signal.

With reference to any one of the first aspect, or the first to the forty-third possible implementations of the first aspect, in a forty-fourth possible implementation of the first aspect, a cyclic prefix of each response signal is longer than a cyclic prefix of a normal subframe.

With reference to any one of the first aspect, or the first to the forty-fourth possible implementations of the first aspect, in a forty-fifth possible implementation of the first aspect, the cyclic prefix of the response signal is equal to or shorter than a cyclic prefix of a random access signal.

With reference to any one of the first aspect, or the first to the forty-fifth possible implementations of the first aspect, in a forty-sixth possible implementation of the first aspect, the first wireless network device receives a random access signal sent by the second wireless network device according to the second signal set.

With reference to any one of the first aspect, or the first to the forty-sixth possible implementations of the first aspect, in a forty-seventh possible implementation of the first aspect, a random access signal and a response signal that are related to a same second signal set use different code resources, and/or a random access signal and a response signal use a same frequency resource, and the random access signal and the response signal are related to a same second signal set, and/or duration of a random access signal is longer than or equal to duration of a response signal, and the random access signal and the response signal are related to a same second signal set, and/or relative locations of symbols occupied in a subframe by a random access signal and a response signal are the same, and the random access signal and the response signal are related to a same second signal set.

With reference to either of the forty-sixth and the forty-seventh possible implementations of the first aspect, in a forty-eighth possible implementation of the first aspect, the random access signal sent according to the second signal set includes a resource used by the random access signal is determined according to a resource used by the second signal set, where the resource used by the random access signal includes at least one of a time resource, a frequency resource, or a code resource, and the resource used by the second signal set includes at least one of the time resource, the frequency resource, or the code resource, or a resource used by the random access signal is determined according to a random access signal resource set carried in the second signal set.

In this way, the random access signal is bound with an inner-loop beam, so that narrow beam communication can be implemented between a base station and UE.

With reference to any one of the first aspect, or the forty-sixth to the forty-eighth possible implementations of the first aspect, in a forty-ninth possible implementation of the first aspect, the method further includes sending, by the first wireless network device, a random access answer signal according to the random access signal sent by the second wireless network device, where a resource of the random access answer signal is associated with a corresponding second signal set.

In this way, the random access answer signal is also bound with an inner-loop beam, so that narrow beam communication can be implemented between the base station and the UE.

With reference to any one of the first aspect, or the first to the forty-ninth possible implementations of the first aspect, in a fiftieth possible implementation of the first aspect, the N first signal sets include a same cell identifier (ID), or are controlled by a same RRC layer.

With reference to any one of the first aspect, or the first to the fiftieth possible implementations of the first aspect, in a fifty-first possible implementation of the first aspect, first signals that have different functions in each of the N first signal sets include same or mutually associated space resources.

With reference to the twenty-third possible implementation of the first aspect, in a fifty-second possible implementation of the first aspect, the first signals that have different function types in a same first signal set include a synchronization signal and a broadcast signal.

With reference to the twenty-fourth possible implementation of the first aspect, in a fifty-third possible implementation of the first aspect, a synchronization signal and a broadcast signal are transmitted on a same symbol, and the broadcast signal is sent on two sides of a frequency band of the synchronization signal.

With reference to any one of the forty-sixth to the fifty-third possible implementations of the first aspect, in a fifty-fourth possible implementation of the first aspect, the random access signal sent according to the second signal set includes the resource used by the random access signal is a resource selected from resources of random access signals that are determined by the second wireless network device according to at least two detected second signal sets, or the resource used by the random access signal is a resource selected from resources of a random access signal determined according to a second signal set that is selected by the second wireless network device from at least two detected second signal sets.

According to a second aspect, a wireless access method is provided, including receiving N first signal sets sent by a first wireless network device on N first resources, where N is an integer greater than 1, feeding back, to the first wireless network device, I response signals for H received first signal sets, where each response signal includes indication information of a resource on which the first signal set is located, both H and I are integers greater than or equal to 1, H is less than or equal to N, and I is less than or equal to H, and receiving J second signal sets sent by the first wireless network device on J second resources according to the I response signals, where J is an integer greater than or equal to 1.

The resource on which the first signal set is located includes at least one of a time resource, a frequency resource, a code resource, or a space resource.

First signal sets sent by the first wireless network device on multiple resources are received, so that the second wireless network device can establish synchronization with the first wireless network device in a timely manner. A second signal set is sent according to a response signal fed back by the second wireless network device for the first signal set, so that the second wireless network device can access the first wireless network device in a timely manner after synchronization, and the second signal set can be sent more effectively, thereby saving a second resource, and avoiding interference caused when the second signal set is sent on an invalid second resource. A timely manner indicates a delay range allowed by user equipment and/or a system.

In a first possible implementation of the second aspect, the first signal set at least includes a synchronization signal, and the second signal set at least includes system information.

With reference to the second aspect or the first possible implementation of the second aspect, in a second possible implementation of the second aspect, I is variable.

With reference to any one of the second aspect, or the first or the second possible implementation of the second aspect, in a third possible implementation of the second aspect, J is variable.

With reference to any one of the second aspect, or the first to the third possible implementations of the second aspect, in a fourth possible implementation of the second aspect, N is constant, and the N first resources are corresponding to coverage of one area.

The area may be a cell. In this way, all second wireless network devices covered by the cell can establish synchronization in a timely manner, so that all the second wireless network devices in the cell can access the first wireless network device in a timely manner.

With reference to any one of the second aspect, or the first to the fourth possible implementations of the second aspect, in a fifth possible implementation of the second aspect, a set of the first signal set and the second signal set includes all configuration signals required when the second wireless network device and the first wireless network device establish a wireless connection.

With reference to any one of the second aspect, or the first to the fifth possible implementations of the second aspect, in a sixth possible implementation of the second aspect, a data size of the first signal set is less than a data size of the second signal set.

In this way, most configuration signals used when the second wireless network device accesses the first wireless network device are sent in the second signal set, thereby reducing system signaling overheads, and further reducing power overheads and energy overheads of the first wireless network device.

With reference to any one of the second aspect, or the first to the sixth possible implementations of the second aspect, in a seventh possible implementation of the second aspect, the first resource includes a first space resource, and the second resource includes a second space resource.

With reference to any one of the second aspect, or the first to the seventh possible implementations of the second aspect, in an eighth possible implementation of the second aspect, the first resource includes a first time resource, and the second resource includes a second time resource, where N first time resources are used to send first signal sets corresponding to N first space resources, and J second time resources are used to send second signal sets corresponding to J second space resources.

With reference to any one of the second aspect, or the first to the eighth possible implementations of the second aspect, in a ninth possible implementation of the second aspect, J is less than N.

With reference to any one of the first to the ninth possible implementations of the second aspect, in a tenth possible implementation of the second aspect, each second signal set further includes a second synchronization signal and a second broadcast signal, or the first signal set further includes a first measurement pilot signal, and the second signal set further includes a second synchronization signal and a second broadcast signal, or the first signal set further includes a first measurement pilot signal, and the second signal set further includes a second synchronization signal, a second broadcast signal, and a second measurement pilot signal, or the first signal set further includes a first measurement pilot signal and a first broadcast signal, and the second signal set further includes a second synchronization signal and a second broadcast signal, or the first signal set further includes a first measurement pilot signal and a first broadcast signal, and the second signal set further includes a second synchronization signal, a second broadcast signal, and a second measurement pilot signal.

With reference to any one of the second aspect, or the first to the tenth possible implementations of the second aspect, in an eleventh possible implementation of the second aspect, the second signal set is different from the first signal set corresponding to the second signal set.

In this way, the first signal set is different from the second signal set, so that the second wireless network device can determine, before sending a response signal, that the first signal set is received.

Correspondingly, the second wireless network device determines, before sending the response signal, that a received signal is a signal in the first signal set.

On a side of the second wireless network device, different features of a corresponding first signal set and a corresponding second signal set may be learned in advance. In this way, the second wireless network device can determine, by identifying the features, whether the received signal is a signal in the first signal set or a signal in the second signal set.

With reference to the eleventh possible implementation of the second aspect, in a twelfth possible implementation of the second aspect, that the second signal set is different from the first signal set corresponding to the second signal set includes a second signal in the second signal set is different from a first signal in the first signal set corresponding to the second signal set, and the first signal and the second signal have a same function type.

With reference to the twelfth possible implementation of the second aspect, in a thirteenth possible implementation of the second aspect, that a second signal in the second signal set is different from a first signal in the first signal set corresponding to the second signal set, and the first signal and the second signal have a same function type includes that the second signal is different from the first signal in at least one of a data size, a used time resource, a used frequency resource, or a used code resource, and the first signal and the second signal have a same function type.

Correspondingly, before sending a response signal, the second wireless network device determines, according to at least one of a data size, a used time resource, a used frequency resource, or a used code resource of the first signal in the received first signal set, that the received signal is a signal in the first signal set.

With reference to either of the twelfth and the thirteenth possible implementations of the second aspect, in a fourteenth possible implementation of the second aspect, the first signal and the second signal that have a same function type are a first synchronization signal and a second synchronization signal, and sequences of the first synchronization signal and the second synchronization signal are different, or a first synchronization signal includes a first primary synchronization signal and a first secondary synchronization signal, a second synchronization signal includes a second primary synchronization signal and a second secondary synchronization signal, and an intersymbol spacing between the first primary synchronization signal and the first secondary synchronization signal is different from an intersymbol spacing between the second primary synchronization signal and the second secondary synchronization signal.

In this way, the second network device can determine, by detecting a difference between the first synchronization signal and the second synchronization signal, whether to send a response signal.

Correspondingly, the second wireless network device determines, according to the sequence of the first synchronization signal, or the intersymbol spacing between the first primary synchronization signal and the first secondary synchronization signal that are included in the first synchronization signal, that the received signal is a signal in the first signal set.

With reference to either of the thirteenth and the fourteenth possible implementations of the second aspect, in a fifteenth possible implementation of the second aspect, the first signal and the second signal that have a same function type are a first broadcast signal and a second broadcast signal, and a difference between the first broadcast signal and the second broadcast signal includes that data packet sizes are different, or data packet sizes are the same, but carried information is different, or data packet sizes are the same, and carried information is the same, but used scrambling codes are different, or data packet sizes are the same, and carried information is the same, but masks scrambling cyclic redundancy check (CRC) codes of data packets are different, or sizes of time-frequency resources used for transmission are different.

In this way, the second wireless network device can determine, by detecting a difference between the first broadcast signal and the second broadcast signal, whether to send a response signal.

Correspondingly, the second wireless network device determines, according to a data packet size, a carried signal, a scrambling code, a mask scrambling CRC of a data packet, and a size of a used time-frequency resource that are of the first broadcast signal, that the received signal is a signal in the first signal set.

With reference to any one of the second aspect, or the first to the fifteenth possible implementations of the second aspect, in a sixteenth possible implementation of the second aspect, first signals that have a same function type in the N first signal sets are different from each other.

In this way, the first signal set can carry outer-loop beam information, and the second wireless network device can feed back, according to a received first signal set, a response signal corresponding to the first signal set.

Correspondingly, the second wireless network device determines, according to the received first signal set, information about a corresponding resource. The resource includes a space resource.

With reference to the sixteenth possible implementation of the second aspect, in a seventeenth possible implementation of the second aspect, that first signals that have a same function type in the N first signal sets are different from each other includes locations of at least one of time resources in a frame structure, frequency resources, or code resources separately used by the first signals that have a same function type in the N first signal sets are different.

Correspondingly, the second wireless network device determines the information about the corresponding resource according to a location of at least one of a time resource, a frequency resource, or a code resource used by a first signal in the received first signal set in the frame structure. The resource includes a space resource.

With reference to the seventeenth possible implementation of the second aspect, in an eighteenth possible implementation of the second aspect, the first signal is the first synchronization signal, or the first broadcast signal.

Correspondingly, the second wireless network device determines the information about the corresponding resource according to a location of at least one of a time resource, a frequency resource, or a code resource used by the received first synchronization signal or the received first broadcast signal in the frame structure. The resource includes a space resource.

With reference to any one of the second aspect, or the first to the eighteenth possible implementations of the second aspect, in a nineteenth possible implementation of the second aspect, a period T1 of sending a first signal in the N first signal sets is longer than or equal to a period T2 of sending a second signal in the J second signal sets, and the first signal and the second signal have a same function type.

In this way, the system signaling overheads, the energy overheads, and the power overheads can be further reduced.

With reference to the nineteenth possible implementation of the second aspect, in a twentieth possible implementation of the second aspect, within the period T1 of sending the first signal in the first signal set, the first signal in the N first signal sets is sent in at least one contiguous radio frame.

With reference to the nineteenth or the twentieth possible implementation of the second aspect, in a twenty-first possible implementation of the second aspect, within the period T1 of sending the first signal in the first signal set, each radio frame includes only one first signal, or at least two first signals.

With reference to any one of the second aspect, or the first to the twenty-first possible implementations of the second aspect, in a twenty-second possible implementation of the second aspect, the first signal set is included in a dedicated subframe in a radio frame, and each dedicated subframe includes at least two first signal sets, where different first signal sets occupy different symbols, and a beam switch interval exists between the symbols occupied by the different first signal sets, and/or a same first signal set occupies a same beam time domain, and the same beam time domain is determined by using two adjacent beam switch intervals.

In this way, the same first signal set is sent in one beam time domain, so that the second wireless network device can obtain a corresponding configuration signal by scanning a round of (N) outer-loop beams, and can initiate random access as soon as possible after receiving a second beam signal.

With reference to the twenty-second possible implementation of the second aspect, in a twenty-third possible implementation of the second aspect, that a same first signal set occupies a same beam time domain includes first signals that have different function types in the same first signal set occupy different symbols in the same beam time domain, or first signals that have different function types in the same first signal set occupy a same symbol in the same beam time domain, and occupy different frequency resources.

With reference to any one of the nineteenth to the twenty-third possible implementations of the second aspect, in a twenty-fourth possible implementation of the second aspect, within the period T1 of sending the first signal in the first signal set, each radio frame includes a maximum of one second signal, and the first signal and the second signal have a same function type.

With reference to any one of the second aspect, or the first to the twenty-fourth possible implementations of the second aspect, in a twenty-fifth possible implementation of the second aspect, that each response signal includes indication information of a resource on which the first signal set is located includes a resource used by each response signal is determined according to a resource used by at least one first signal in the first signal set, where the resource used by each response signal includes at least one of a time resource, a frequency resource, or a code resource, and the resource used by the first signal includes at least one of the time resource, the frequency resource, or the code resource.

With reference to any one of the second aspect, or the first to the twenty-fifth possible implementations of the second aspect, in a twenty-sixth possible implementation of the second aspect, the I response signals are different from each other.

With reference to the twenty-sixth possible implementation of the second aspect, in a twenty-seventh possible implementation of the second aspect, that the I response signals are different from each other includes time resources, frequency resources, or code resources separately used by the I response signals are different.

With reference to any one of the second aspect, or the first to the twenty-seventh possible implementations of the second aspect, in a twenty-eighth possible implementation of the second aspect, relative locations of the time resources used by the I response signals are fixed or changeable in the frame structure.

With reference to any one of the second aspect, or the first to the twenty-eighth possible implementations of the second aspect, in a twenty-ninth possible implementation of the second aspect, the resource used by each response signal is associated with a corresponding first signal set.

With reference to the twenty-ninth possible implementation of the second aspect, in a thirtieth possible implementation of the second aspect, that the resource used by each response signal is associated with a corresponding first signal set includes a time resource used by each response signal is associated with at least one of a time resource, a frequency resource, or a code resource of the corresponding first signal set, and/or a frequency resource used by each response signal is associated with at least one of a time resource, a frequency resource, or a code resource of the corresponding first signal set, and/or a space resource used by each response signal is associated with at least one of a time resource, a frequency resource, or a code resource of the corresponding first signal set.

With reference to any one of the second aspect, or the first to the thirtieth possible implementations of the second aspect, in a thirty-first possible implementation of the second aspect, a response signal that is fed back when the second wireless network device is in an idle mode is different from a response signal that is fed back when the second wireless network device is in a connected mode.

In this way, the first wireless network device can determine, according to a received response signal fed back by the second wireless network device for an outer-loop beam, a period of sending a second signal set in a corresponding inner-loop beam.

With reference to the thirty-first possible implementation of the second aspect, in a thirty-second possible implementation of the second aspect, that a response signal that is fed back when the second wireless network device is in an idle mode is different from a response signal that is fed back when the second wireless network device is in a connected mode includes used sequences are different.

With reference to any one of the second aspect, or the first to the thirty-second possible implementations of the second aspect, in a thirty-third possible implementation of the second aspect, when the M second resources include the M second time resources, a location of each second time resource is fixed or changeable in the frame structure.

With reference to the thirty-third possible implementation of the second aspect, in a thirty-fourth possible implementation of the second aspect, when the location of each second time resource is changeable in the frame structure, the first wireless network device notifies the second wireless network device of each second time resource by using a corresponding first signal set.

With reference to any one of the second aspect, or the first to the thirty-fourth possible implementations of the second aspect, in a thirty-fifth possible implementation of the second aspect, the I response signals are fed back after the second wireless network device determines that the corresponding first signal set meets a feedback condition.

With reference to the thirty-fifth possible implementation of the second aspect, in a thirty-sixth possible implementation of the second aspect, the feedback condition includes when the first signal set at least includes a first synchronization signal, a peak of the first synchronization signal in the first signal set exceeds a preset threshold, or when the first signal set at least includes a first synchronization signal and the first measurement pilot signal, a peak of the first synchronization signal exceeds a preset threshold, and an RSRP of the first measurement pilot signal exceeds a preset threshold, or when the first signal set at least includes a first synchronization signal, the first measurement pilot signal, and the first broadcast signal, a peak of the first synchronization signal exceeds a preset threshold, an RSRP of the first measurement pilot signal exceeds a preset threshold, and the first broadcast signal is correctly demodulated.

In this way, a feedback condition of a response signal is set, so that it can be ensured that the second wireless network device performs a feedback only on a beam with a guaranteed communication effect, and in addition, interference caused by an invalid response signal can be avoided.

With reference to any one of the second aspect, or the first to the thirty-sixth possible implementations of the second aspect, in a thirty-seventh possible implementation of the second aspect, within a period of time, when the second wireless network device determines that R first signal sets meet the feedback condition, and R is an integer greater than 1, the second wireless network device performs a response feedback on at least one of the R first signal sets.

With reference to the thirty-seventh possible implementation of the second aspect, in a thirty-eighth possible implementation of the second aspect, the at least one of the R first signal sets is one optimal first signal set or W preferable first signal sets, and W is an integer greater than 1 and less than R.

With reference to any one of the second aspect, or the first to the thirty-eighth possible implementations of the second aspect, in a thirty-ninth possible implementation of the second aspect, each response signal and a first signal set that is corresponding to the response signal obtained by means of feedback are located in a same subframe or radio frame.

With reference to any one of the second aspect, or the first to the thirty-ninth possible implementations of the second aspect, in a fortieth possible implementation of the second aspect, within the period T1 of sending the first signal set, radio frames used by the I response signals are after radio frames used by the N first signal sets.

With reference to any one of the second aspect, or the first to the fortieth possible implementations of the second aspect, in a forty-first possible implementation of the second aspect, relative locations of subframes occupied in different radio frames by the second signal in the second signal set and the first signal in the first signal set are the same, the second signal set is corresponding to the first signal set, and the second signal and the first signal have a same function type.

With reference to any one of the second aspect, or the first to the forty-first possible implementations of the second aspect, in a forty-second possible implementation of the second aspect, relative locations of symbols occupied in different subframes by the second signal in the second signal set and the first signal in the first signal set are the same, the second signal set is corresponding to the first signal set, and the second signal and the first signal have a same function type.

With reference to any one of the first to the forty-second possible implementations of the second aspect, in a forty-third possible implementation of the second aspect, each response signal is sent at a scheduled time according to a downlink of the first synchronization signal.

With reference to any one of the second aspect, or the first to the forty-third possible implementations of the second aspect, in a forty-fourth possible implementation of the second aspect, a cyclic prefix of each response signal is longer than a cyclic prefix of a normal subframe.

With reference to any one of the second aspect, or the first to the forty-fourth possible implementations of the second aspect, in a forty-fifth possible implementation of the second aspect, the cyclic prefix of the response signal is equal to or shorter than a cyclic prefix of a random access signal.

With reference to any one of the second aspect, or the first to the forty-fifth possible implementations of the second aspect, in a forty-sixth possible implementation of the second aspect, the method further includes sending, by the second wireless network device to the first wireless network device, a random access signal determined according to the second signal set.

With reference to any one of the second aspect, or the first to the forty-sixth possible implementations of the second aspect, in a forty-seventh possible implementation of the second aspect, a random access signal and a response signal that are related to a same second signal set use different code resources, and/or a random access signal and a response signal use a same frequency resource, and the random access signal and the response signal are related to a same second signal set, and/or duration of a random access signal is longer than or equal to duration of a response signal, and the random access signal and the response signal are related to a same second signal set, and/or relative locations of symbols occupied in a subframe by a random access signal and a response signal are the same, and the random access signal and the response signal are related to a same second signal set.

With reference to either of the forty-sixth and the forty-seventh possible implementations of the second aspect, in a forty-eighth possible implementation of the second aspect, the random access signal sent according to the second signal set includes a resource used by the random access signal is determined according to a resource used by the second signal set, where the resource used by the random access signal includes at least one of a time resource, a frequency resource, or a code resource, and the resource used by the second signal set includes at least one of the time resource, the frequency resource, or the code resource, or a resource used by the random access signal is determined according to a random access signal resource set carried in the second signal set.

In this way, the random access signal is bound with an inner-loop beam, so that narrow beam communication can be implemented between a base station and UE.

With reference to any one of the second aspect, or the forty-sixth to the forty-eighth possible implementations of the second aspect, in a forty-ninth possible implementation of the second aspect, the method further includes receiving, by the second wireless network device, a random access answer signal sent by the first wireless network device, where a resource of the random access answer signal is associated with a corresponding second signal set.

In this way, the random access answer signal is also bound with an inner-loop beam, so that narrow beam communication can be implemented between the base station and the UE.

Correspondingly, the second wireless network device determines the resource of the random access answer signal according to the second signal set, and receives the random access answer signal on the determined resource of the random access answer signal.

With reference to any one of the second aspect, or the first to the forty-ninth possible implementations of the second aspect, in a fiftieth possible implementation of the second aspect, the N first signal sets include a same cell identifier (ID), or are controlled by a same RRC layer.

With reference to any one of the second aspect, or the first to the fiftieth possible implementations of the second aspect, in a fifty-first possible implementation of the second aspect, first signals that have different function types in each of the N first signal sets include same or mutually associated space resources.

With reference to the twenty-third possible implementation of the second aspect, in a fifty-second possible implementation of the second aspect, the first signals that have different function types in a same first signal set include the first synchronization signal and the first broadcast signal.

With reference to the twenty-fourth possible implementation of the second aspect, in a fifty-third possible implementation of the second aspect, in a time domain, the first synchronization signal and the first broadcast signal are on a same symbol, and in a frequency domain, the broadcast signal is on two sides of a frequency band of the synchronization signal.

With reference to any one of the forty-sixth to the fifty-third possible implementations of the second aspect, in a fifty-fourth possible implementation of the second aspect, the random access signal determined according to the second signal set includes the resource used by the random access signal is a resource selected from resources of random access signals that are determined according to at least two detected second signal sets, or the resource used by the random access signal is a resource selected from resources of a random access signal determined according to a second signal set that is selected by the second wireless network device from at least two detected second signal sets.

According to a third aspect, a wireless network device is further provided, including a processor, a memory, and a transceiver, where the memory is configured to store an instruction, the processor is configured to execute the instruction stored by the memory, so as to control the transceiver to receive and send a signal, and when the processor executes the instruction stored by the memory, the wireless network device is configured to complete the method according to any one of the first aspect or all possible implementations of the first aspect.

According to a fourth aspect, a wireless network device is further provided, including a processor, a memory, and a transceiver, where the memory is configured to store an instruction, the processor is configured to execute the instruction stored by the memory, so as to control the transceiver to receive and send a signal, and when the processor executes the instruction stored by the memory, the wireless network device is configured to complete the method according to any one of the second aspect or all possible implementations of the second aspect.

For ease of understanding, some concepts related to the present invention are provided as examples for reference, and are shown as follows.

The 3rd Generation Partnership Project (3GPP) is a project that is purpose built to develop a wireless communications network. Generally, a 3GPP-related institution is referred to as a 3GPP institution.

A wireless communications network is a network that provides a wireless communication function. The wireless communications network may use different communications technologies, such as Code Division Multiple Access (CDMA), Wideband Code Division Multiple Access (WCDMA), Time Division Multiple Access (TDMA), Frequency Division Multiple Access (FDMA), orthogonal frequency division multiple access (OFDMA), single carrier frequency division multiple access (SC-FDMA), and carrier sense multiple access with collision avoidance. A network may include a second generation (2G) network, a 3G network, and a 4G network according to factors such as capacities, rates, or delays of different networks. A typical 2G network includes a Global System for Mobile Communications (GSM) for short) network or a general packet radio service (GPRS) network. A typical 3G network includes a Universal Mobile Telecommunications System (UMTS) network. A typical 4G network includes a Long Term Evolution (LTE) network. The UMTS network may also be referred to as a universal terrestrial radio access network (UTRAN) sometimes, and the LTE network may also be referred to as an evolved universal terrestrial radio access network (E-UTRAN) sometimes. The network may include a cellular communications network and a wireless local area network (WLAN) according to different resource allocation manners. The cellular communications network is dominant in scheduling, and the WLAN is dominant in contention. All the foregoing 2G, 3G, and 4G networks are cellular communications networks. A person skilled in the art should learn that with technology development, technical solutions provided in the embodiments of the present invention may be similarly applied to another wireless communications network, such as a 4.5G or 5G network, or another non-cellular communications network. For brevity, sometimes, the wireless communications network is referred to as a network for short in the embodiments of the present invention.

A cellular communications network is one type of wireless communications network, and a terminal device is connected to a network device by using a wireless channel in a cellular wireless networking manner, so that users can communicate with each other in an activity. The cellular communications network mainly features terminal mobility, and has functions of cross-cell handover and automatic roaming across local networks.

User equipment (UE) is a terminal device, and may be a mobile terminal device, or an immobile terminal device. The equipment is mainly configured to receive or send service data. The user equipment may be distributed in a network. The user equipment has different names in different networks, such as a terminal, a mobile station, a subscriber unit, a station, a cellular phone, a personal digital assistant, a wireless modem, a wireless communications device, a handheld device, a laptop computer, a cordless telephone set, or a wireless local loop station. The user equipment may communicate with one or more core networks by using a radio access network (RAN) (an access part of the wireless communications network). For example, the user equipment exchanges a voice and/or data with the radio access network.

A base station (BS) device may also be referred to as a base station, and is an apparatus that is deployed in a radio access network to provide a wireless communication function. For example, a device that provides a base station function in a 2G network includes a wireless base transceiver station (BTS) and a base station controller (BSC), a device that provides a base station function in a 3G network includes a NodeB and a radio network controller (RNC), a device that provides a base station function in a 4G network includes an evolved NodeB (eNB), and a device that provides a base station function in a WLAN is an access point (AP).

A wireless network device is a device in a wireless communications network. The device may be a base station, or may be user equipment, or may be another network element.

A wireless local area network (WLAN) is a local area network that uses a radio wave as a data transmission medium. Generally, a transmission distance is just several decameters.

An access point (AP) is a device that may be connected to a wireless network, or a wired network. The access point may serve as an intermediary point, so that devices in wired and wireless surfing are connected to each other, and transmit data.

Frame structure, radio frame, subframe, symbol, and timeslot.

FIG. 2b illustrates a frame structure according to an embodiment, where the frame structure is a structure presented when a time resource (time domain) for signal transmission is divided. In wireless communication, time units in a commonly used frame structure are a radio frame, a subframe, and a timeslot in descending order. Specifically, duration corresponding to each time unit may be set according to a specific protocol requirement. In an example of a frame structure in LTE, a length of a radio frame is 10 ms, the radio frame includes 10 subframes a length of each subframe is 1 ms, each subframe further includes two timeslots, and each timeslot (slot) is 0.5 ms. A symbol is a minimum unit of a signal. In an example of an LTE network, each OFDM subcarrier is corresponding to one OFDM symbol. When an intersymbol guard interval is not considered, an OFDM symbol length (an occupied time) is 1/subcarrier spacing. When an intersymbol guard interval is considered, a time occupied by an OFDM symbol is a sum of an OFDM symbol length and a cyclic prefix (CP) length.

In an OFDM system, to eliminate intersymbol interference to a largest extent, a guard interval needs to be inserted between OFDM symbols, and a length Tg of the guard interval is usually greater than maximum delay spread of a wireless channel. In this way, a multipath component of a symbol does not cause interference to a next symbol.

In the guard interval, no signal may be inserted, that is, the guard interval is an idle transmission period. However, in this case, interchannel interference is caused due to multipath propagation, that is, orthogonality between subcarriers is damaged, and interference is caused between different subcarriers. To eliminate the interchannel interference caused due to the multipath propagation, an OFDM symbol whose original width is T is periodically extended, and an extension signal is used to pad the guard interval.

A frame number is a serial number of each radio frame. In an example of an LTE network, frames in LTE are numbered from 0 to 1023, and then are renumbered from 0.

A resource includes at least one of a time resource, a frequency resource, a code resource, or a space resource.

A time resource is a resource occupied by a signal and measured with time. For example, in terms of time, a signal occupies two OFDM symbols, or one subframe, or three radio frames. The time resource may include an absolute time resource and a relative time resource, for example, at least one of a radio frame number, a relative location of a subframe in a radio frame, or a relative location of a symbol in a subframe. Generally, the time resource is fixed or changeable in terms of relative time resource. Generally, if time resources are the same, absolute time resources may be the same, or relative time resources may be the same.

A frequency resource is a resource occupied by a signal and measured with frequency. For example, a signal occupies 10 MHz in terms of frequency. In an OFDM system, a subcarrier quantity is usually used to describe an occupied frequency resource.

A time-frequency resource is a resource occupied by a signal and measured with time and frequency. For example, a signal occupies two OFDM symbols in terms of time, and occupies 10 MHz in terms of frequency.

A code resource is a resource occupied by a signal and measured with code. For example, a spreading code in WCDMA, or a sequence resource used by a signal such as a sequence used by a synchronization signal is also referred to as a code resource.

A sequence is one type of code resource.

A space resource is a resource occupied by a signal and measured with beam. For multiple-input multiple-output (MIMO) transmission, signals may be transmitted in parallel on a same time-frequency resource by using beams in different directions.

RRC (radio resource control) is a radio resource control protocol.

RRC processes layer-3 information of a control plane between UE and a UTRAN.

Generally, the RRC includes at least one of the following functions: broadcasting information provided by a non-access stratum of a core network, correlating broadcast information with an access layer, or establishing, re-establishing, maintaining, and releasing an RRC connection between the UE and the UTRAN.

For the broadcasting information provided by a non-access stratum of a core network, RRC is responsible for broadcasting network system information to the UE. Generally, system information is repeated according to a particular basic law. RRC is responsible for plan execution, segmentation, and repetition, and also supports broadcasting of upper-layer information.

For correlating broadcast information with an access layer, RRC is responsible for broadcasting network system information to the UE. Generally, system information is repeated according to a particular basic law. RRC is responsible for plan execution, segmentation, and repetition.

For establishing, re-establishing, maintaining, and releasing an RRC connection between the UE and the UTRAN, to establish the first signal connection of the UE, an upper layer of the UE requests to establish an RRC connection. An RRC connection establishment process includes available cell reselection, access permission control, and layer-2 signal link establishment. The upper layer also requests to release the RRC connection, so as to disconnect a last signal connection, or an RRC layer initiates RRC connection release when an RRC link fails. If the connection fails, the UE requests to re-establish the RRC connection. If the RRC connection fails, RRC releases an allocated resource.

Access is a process of establishing an initial connection between wireless network devices. A specific wireless network device may be not limited. Access is usually performed between UE and a base station, or between a micro base station and a macro base station. Access is also applied between UEs in the embodiments of the present invention.

A time order is a sequential time order.

A synchronization signal is a signal used by a receiving party to implement at least one of frequency synchronization or time synchronization with a sending party.

A measurement pilot signal is a signal used for channel estimation or measurement between a receiving party and a sending party, and is also referred to as a reference signal.

System information broadcast may be referred to as system information for short, mainly provides main information of an accessed network, so as to establish a wireless connection to UE. Therefore, the UE obtains enough access information and public configuration parameters of cell selection, and reselection. A system message in LTE is divided into multiple system information blocks (SIB). One block is referred to as a master information block (MIB), the MIB is also referred to as a broadcast signal, and the other SIBs are referred to as system messages. LTE system information broadcast is fully consistent with 3G system information broadcast in terms of function, but there is a great difference in terms of scheduling and specific information content. The MIB generally includes a limited quantity of most important and common transmission parameters. The other SIBs generally include parameters such as cell radio configuration, cell reselection information, a neighboring cell list, a home eNodeB identifier (home eNB identifier), notification information of earthquake and tsunami warning (ETWS) or common alert (CMAS), or multimedia multicast (MBMS) control information.

Idle mode: UE in an idle mode does not have a radio link resource. If the UE has no data (including a voice) for downloading or uploading within a period of time, the UE release an RRC connection, and the UE is in RRC_idle, that is, RRC_idle is an idle mode.

Connected (connected) mode: If an RRC connection exists, UE is in RRC_CONNECTED, that is, the UE is in a connected mode. When UE in an idle mode needs to initiate a service again, the UE needs to initiate a service request (Service Request). The service request includes random access, RRC connection, and fault bearer setup. When an inactive timer of the UE expires (which indicates that there is no data (including a voice) for downloading or uploading), the UE returns to an idle mode from a connected mode.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 6b is a schematic diagram of a time-frequency resource according to an embodiment;

DETAILED DESCRIPTION OF ILLUSTRATIVE EMBODIMENTS

Figure 1:
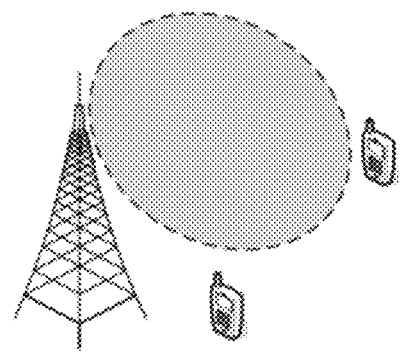
FIG. 1 is a schematic coverage diagram of a base station.
Figure 2A:
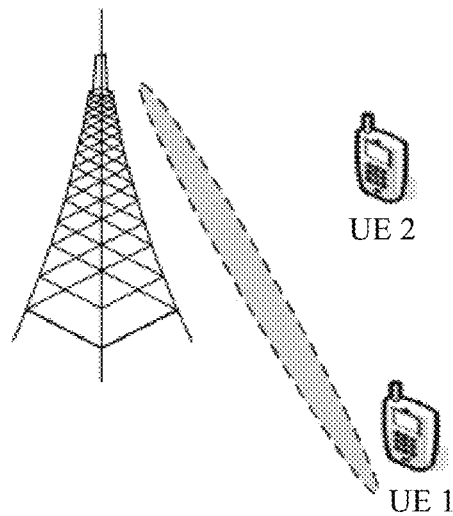
FIG. 2a is a schematic coverage diagram of a base station according to an embodiment.
Figure 2B:
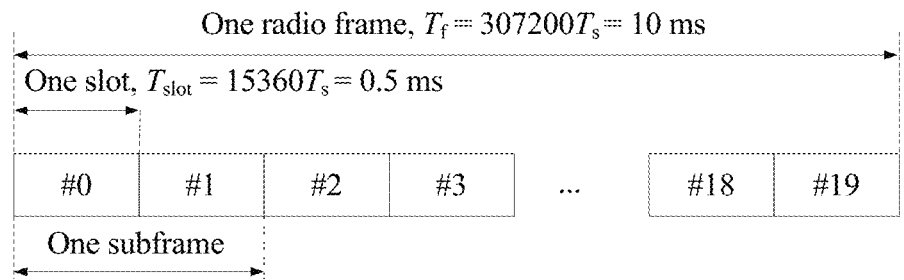
FIG. 2b illustrates a frame structure according to an embodiment.

The following describes the technical solutions in the embodiments with reference to the accompanying drawings in the embodiments. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Terms such as "component", "module", and "system" used in this application are used to indicate a computer-related entity. The computer-related entity may be hardware, firmware, a combination of hardware and software, software, or software in operation. For example, a component may be, but is not limited to processing performed on a processor, a processor, an object, an executable file, a thread in execution, a program, and/or a computer. For example, both an application that runs on a computing device and the computing device may be components. One or more components may reside within a process and/or a thread in execution, and a component may be located in one computer and/or distributed between two or more computers. In addition, these components can be executed in various computer-readable media that have various data structures. These components may perform communication in a local process manner and/or a remote process manner according to a signal that has one or more packets (for example, data from a component, where the component interacts with other components in a local system and a distributed system, and/or interacts with another system in a signal manner by using a network such as the Internet).

In addition, this application describes all aspects with reference to a wireless network device. The wireless network device may be a base station, and the base station may be configured to communicate with one or more user equipments, or may be configured to communicate with one or more base stations with partial user equipment functions (for example, communication between a macro base station and a micro base station or between access points). The wireless network device may be user equipment, and the user equipment may be configured to communicate with one or more user equipments (for example, device-to-device (D2D) communication), or may be configured to communicate with one or more base stations. The user equipment may also be referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless telephone set, a Session Initiation Protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device used for communication in a wireless system. The base station may also be referred to as an access point, a node, a NodeB, an evolved NodeB (eNB), or another network entity. In addition, the base station may include some or all functions of the foregoing network entities. The base station may communicate with a wireless terminal by using an air interface. The communication may be performed by using one or more sectors. The base station may serve as a router between the wireless terminal and a rest part of an access network by converting a received air interface frame into an IP packet. The access network includes an Internet Protocol (IP) network. The base station may further coordinate management of an air interface attribute, and may be a gateway between a wired network and a wireless network.

This application presents all aspects, embodiments, or features by describing a system that may include multiple devices, components, modules, and the like. It should be understood that each system may include another device, component, module, and the like, and/or may not include all devices, components, modules, and the like discussed with reference to the accompanying drawings. In addition, a combination of these solutions can be used.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

In addition, in the embodiments of the present invention, "for example" is used to indicate an example, illustration, or description. Any embodiment or design solution described as an "example" in this application should not be construed as preferable or more advantageous than other embodiments or design solutions. Exactly, "for example" is used to present a concept in a specific manner.

In the embodiments of the present invention, one of "information", "signal (signal)", "message", or "channel" may be used sometimes. It should be noted that expressed meanings are consistent when differences are not emphasized. One of "of", "corresponding (corresponding, relevant)", or "corresponding" may be used sometimes. It should be noted that expressed meanings are consistent when differences are not emphasized.

A network architecture and a service scenario described in the embodiments of the present invention are used to describe the technical solutions in the embodiments of the present invention more clearly, and are not construed as a limitation to the technical solutions provided in the embodiments of the present invention. A person of ordinary skill in the art may understand that as the network architecture evolves and a new service scenario occurs, the technical solutions provided in the embodiments of the present invention are also applicable to a similar technical problem.

The embodiments of the present invention may be applied to a time division duplex (TDD) scenario, or may be applied to a frequency division duplex (FDD) scenario.

The embodiments of the present invention are illustrated by using a 4G network scenario in a wireless communications network. It should be noted that the solutions in the embodiments of the present invention may be further applied to another wireless communications network, and a corresponding name may be replaced with a corresponding function name in the another wireless communications network.

An LTE network uses an OFDM technology. OFDM is a frequency division multiplexing multi-carrier transmission manner, and only multiplexed signals (subcarriers) are orthogonal. A high-speed data stream is converted into multiple parallel low-speed data streams in the OFDM technology by means of serial/parallel conversion, and the multiple parallel low-speed data streams are allocated to sub-channels on subcarriers with different frequencies for transmission. The OFDM technology uses mutually orthogonal subcarriers, and each subcarrier is corresponding to one symbol, so that subcarrier frequency spectrums are overlapped. In this way, spectrum utilization can be greatly improved. In an OFDM system, a subcarrier spacing $\Delta f$ refers to a frequency offset between two adjacent subcarriers in the OFDM system. The subcarrier spacing times a maximum subcarrier quantity in a system theory is a bandwidth of the OFDM system. The maximum subcarrier quantity in the system theory is a maximum subcarrier quantity in a case in which a frequency guard band is not considered, but in practice, about 10% of the guard band is usually reserved in the OFDM system. Therefore, a subcarrier quantity actually configured in the system is less than the maximum subcarrier quantity.

An LTE physical layer stipulates that a minimum time unit in a time domain is $T_s=1/(15000 \times 2048)s=32.55$ ns and is corresponding to a 30.72 MHz baseband sampling rate. A radio frame is used as an interval during uplink transmission and downlink transmission of the LTE physical layer, and one radio frame is $T_f=307200 \times T_s=10$ ms. The LTE physical layer includes two radio frame types: Type 1, used for FDD, and Type 2, used for TDD. The two frame types are different in structure. The frame type Type 1 is applicable to full-duplex and half-duplex FDD. Each radio frame of 10 ms includes 20 timeslots, and each timeslot length is $T_{slot}=15360 \times T_s=0.5$ ms, and the 20 timeslots are numbered from 0 to 19. Two contiguous timeslots numbered as 2i and 2i+1 form a subframe i (subframe number), a subframe length is 1 ms, and subframes are numbered from 0 to 9. For FDD, at each interval of 10 ms, both a resource that may be used for downlink transmission and a resource that may be used for uplink transmission include 10 subframes because the uplink transmission and the downlink transmission are separated in a frequency domain. The frame type Type 2 is used for TDD. A radio frame is divided into two half frames whose length is $T_{slot}=153600 \times T_s=5$ ms, and each half frame includes eight timeslots whose length is $T_{slot}=153600 \times T_s=0.5$ ms and three special timeslots (domains): a DwPTS, a GP, and an UpPTS. Lengths of the DwPTS and the UpPTS are configurable, but a total length of the DwPTS, the UpPTS, and the GP is 1 ms. A subframe 1 and a subframe 6 include a DwPTS, a GP, and an UpPTS. Other subframes are defined as the subframe i formed by the timeslot 2i and the timeslot 2i+1. A subframe 0 and a subframe 5 are used only for downlink transmission. Flexible uplink configuration and downlink configuration are supported, and switch point periods of 5 ms and 10 ms are supported.

To overcome intersymbol interference and inter-subcarrier interference caused due to wireless multipath channel time dispersion, a cyclic prefix CP is introduced. The cyclic prefix indicates that an inter-subcarrier guard interval is set as cyclic duplication of a symbol sequence, that is, a sampling point after each OFDM symbol within Tg is duplicated to the front of the OFDM symbol, to form a prefix, where Tg is a length of a guard interval. Multipath delay spread is related to a cell radius and a wireless channel propagation environment. Generally, if the cell radius is large, the multipath delay spread is also large. In addition, an SFN (single-Frequency network) of LTE needs a relatively long CP. Therefore, two CP lengths are defined in LTE: a short CP, applied to a small cell environment for optimizing CP overheads, and a long CP (also referred to as an extended CP), applied to a case of wide time dispersion or an SFN operation. An OFDM symbol quantity $N_{symb}^{DL}$ in a timeslot depends on a CP length and a subcarrier spacing. Specifically, a time occupied by an OFDM symbol is a sum of an OFDM symbol length (an occupied time) and a CP length, and the OFDM symbol length is 1/subcarrier spacing. If the subcarrier spacing is 15 KHz, there are two CP lengths respectively corresponding to seven OFDM symbols and six OFDM symbols in each timeslot. However, if the subcarrier spacing is 7.5 KHz, there is only one CP length corresponding to three OFDM symbols in each timeslot.

Figure 3:
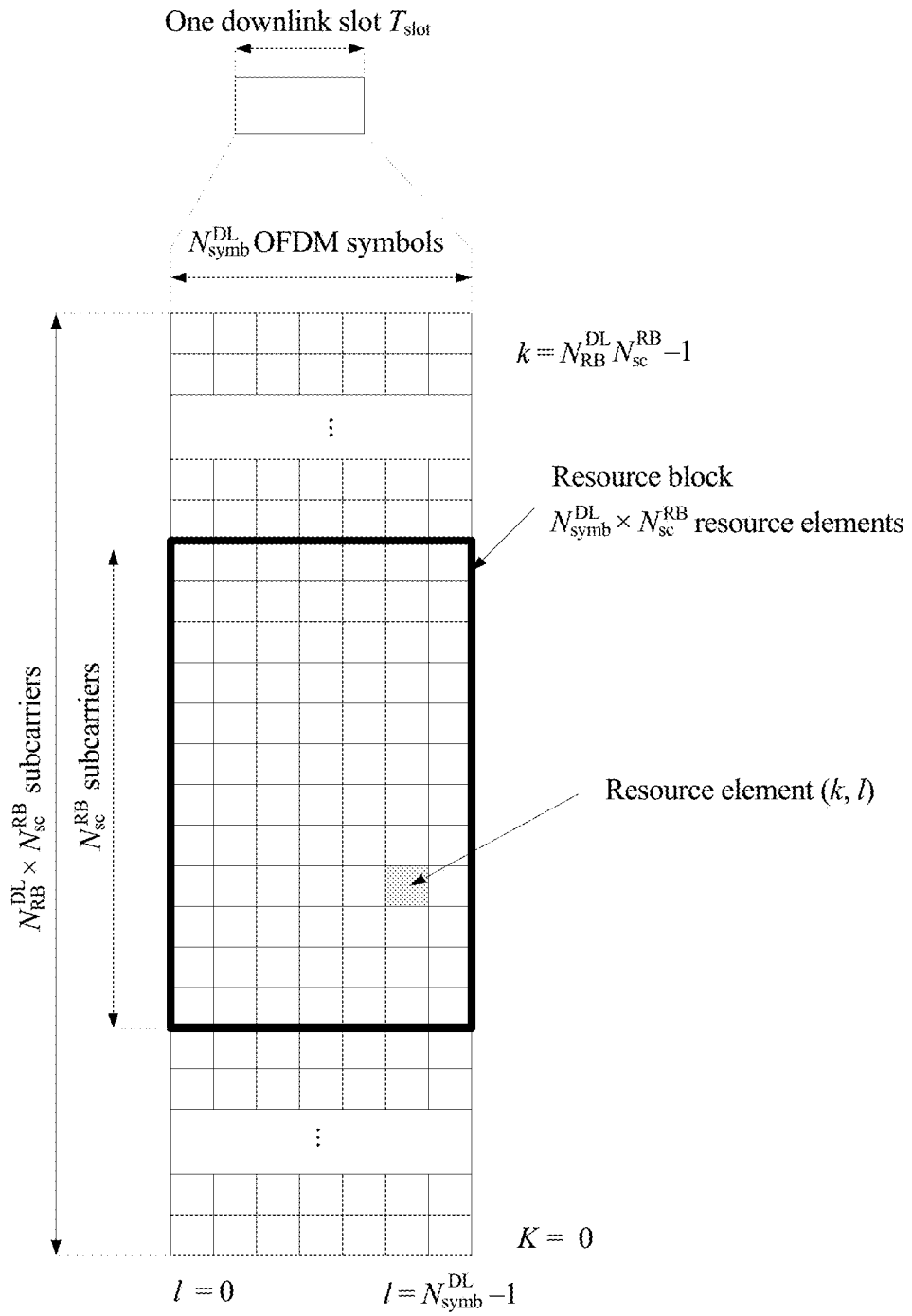
FIG. 3 is a schematic diagram of double-loop beam access according to an embodiment.

A combination of $N_{RB}^{DL} N_{sc}^{RB}$ subcarriers and $N_{symb}^{DL}$ OFDM symbols that are occupied in each timeslot period is referred to as a resource grid, and FIG. 3 shows a structure of a resource grid. A value of $N_{RB}^{DL}$ depends on a downlink transmission bandwidth, and $N_{RB}^{min,DL} \leq N_{RB}^{DL} \leq N_{RB}^{max,DL}$, where $N_{RB}^{min,DL} \leq N_{RB}^{max,DL}$ are supported minimum and maximum downlink transmission bandwidths. An element of a resource grid of an antenna port p is referred to as a resource element, is determined according to only frequency domain and time domain coordinates (k,l), where k=0, ..., $N_{RB}^{DL} N_{sc}^{RB}-1$, and l=0, ..., $N_{symb}^{DL}-1$, and is a modulation symbol on a subcarrier in a timeslot in an LTE system in terms of physical meaning. A resource block (RB) is used to describe mapping from a particular physical channel to a resource element. It is specified that a physical resource block occupies $N_{symb}^{DL}$ contiguous OFDM symbols in a time domain, and occupies resources of $N_{sc}^{RB}$ contiguous subcarriers in a frequency domain. For example, $N_{symb}^{DL}$ and $N_{sc}^{RB}$ may be given by using the following table.

| Configuration | | $N_{sc}^{RB}$ | $N_{symb}^{DL}$ |
|---|---|---|---|
| Normal CP (Normal cyclic prefix) | Δf = 15 KHz | 12 | 7 |
| Extended CP (Extended cyclic prefix) | Δf = 15 KHz | | 6 |
| | Δf = 7.5 KHz | 24 | 3 |

One physical resource block (PRB) includes $N_{symb}^{DL} \times N_{sc}^{RB}$ resource elements, and a duration period in a time domain is one timeslot. The physical resource block occupies 180 KHz in a frequency domain. Physical resource blocks in a frequency domain are numbered from 0 to $N_{RB}^{DL}-1$. A correspondence between a serial number $n_{PRB}$ of a physical resource block in a frequency domain and a resource element (k,l) is:

$$n_{PRB} = \left\lfloor \frac{k}{N_{sc}^{RB}} \right\rfloor,$$

where k is a frequency domain index, and l is a time domain index.

In existing LTE, an initial access procedure of UE is as follows. A base station sends a synchronization signal, the UE obtains timing synchronization and a cell ID according to the synchronization signal, and the UE obtains a location of a common pilot (CRS) according to the cell ID, measures a reference signal received power (RSRP), so as to initially select a cell and camp on the initially selected cell, then detects a broadcast channel and a system message according to the CRS, and obtains a system message (SIB) of the cell. When the UE initiates calling or is paged, the UE initiates random access, and an RRC connection is established between the UE and the base station.

Because a design of the synchronization signal, the broadcast channel, or the system message in the initial access procedure of the UE does not match a narrow beam scenario, some user equipments within the cell cannot be covered, and these user equipments cannot access a network in a timely manner.

The embodiments of the present invention provide a wireless access method and apparatus, a base station, and user equipment, which may be applied to a narrow beam scenario. It should be noted that the method or the apparatus in the embodiments of the present invention may be applied between a base station and user equipment, or may be applied between base stations (for example, a macro base station and a micro base station), or may be applied between user equipments (for example, a D2D scenario). This is not limited herein. "Access" in the embodiments of the present invention may be understood as an initial communication establishment process in a broad sense. In all embodiments of the present invention, an example of access between a base station and UE is used for description.

In the embodiments of the present invention, because downlink communication between a base station and UE is performed by using a narrow beam, uplink communication and downlink communication may be connected by using beam information, and the beam information may be carried by using an uplink signal or a downlink signal, which comprises that beam identifier information or information corresponding to a beam identifier may be carried by using at least one of a used time resource, a used frequency resource, or a used code resource.

Wireless Access Procedure

Figure 4:
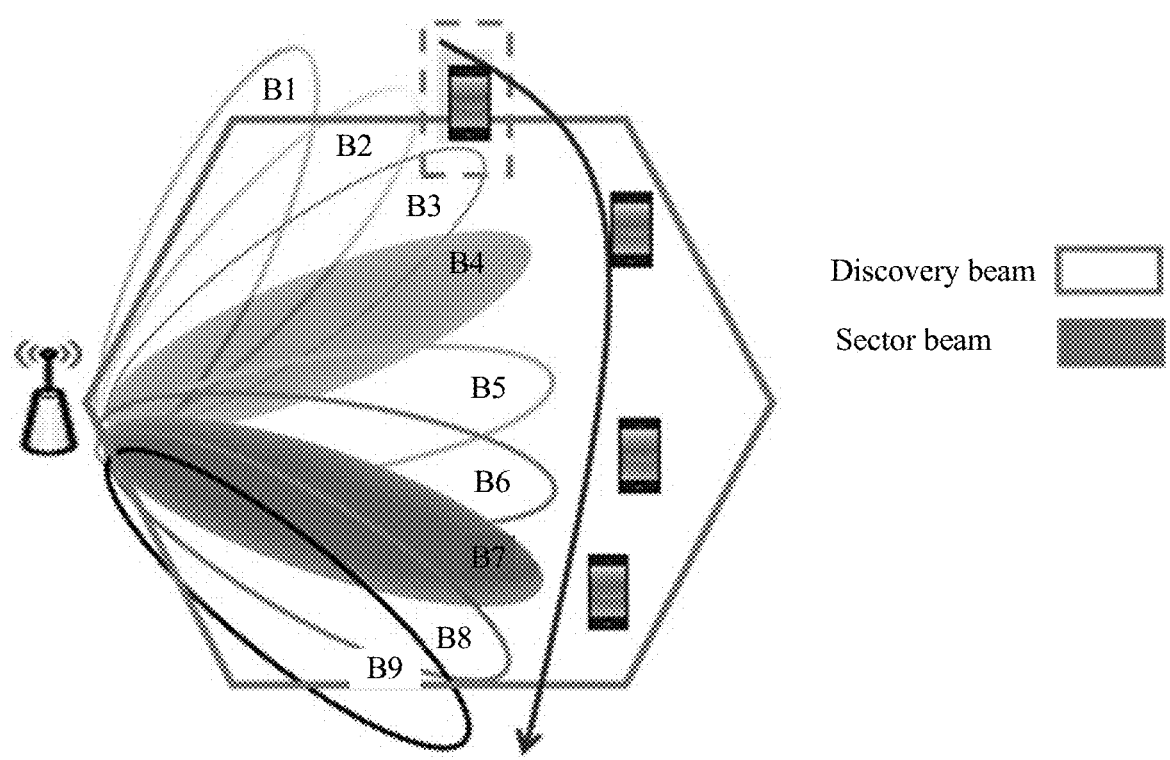
FIG. 4 is a schematic diagram of a double-loop beam access procedure according to an embodiment.

As shown in FIG. 4, in this embodiment, a base station delivers information twice that is required by UE for wireless access (which is referred to as double-loop beam access in this embodiment). In this embodiment, delivering for the first time is referred to as outer-loop beam scanning, and delivering for the second time is referred to as inner-loop beam scanning. Each inner-loop beam is corresponding to an outer-loop beam. A correspondence herein may indicate that coverage ranges are nearly the same (for example, main lobe coverage of beams is consistent, or range relevance is relatively high). A beam width of an outer-loop beam and a beam width of a corresponding inner-loop beam may be the same, or may be different. A beam direction of the outer-loop beam and a beam direction of the corresponding inner-loop beam may be the same, or may be different. In terms of division granularity of space division, an outer-loop beam may be the same as an inner-loop beam, or an outer-loop beam may be different from (smaller than or larger than) an inner-loop beam. For example, there are eight outer-loop beams, and the eight outer-loop beams are inner-loop beams, or there are eight outer-loop beams and four inner-loop beams, and each two outer-loop beams are corresponding to one inner-loop beam. A specific correspondence between an outer-loop beam and an inner-loop beam may be set according to a practical requirement, and may be a one-to-many correspondence, a many-to-one correspondence, or a many-to-many correspondence. This is not limited herein. For example, an outer-loop beam and a corresponding inner-loop beam have a same beam width and a consistent beam direction, or an outer-loop beam and a corresponding inner-loop beam have a same beam width, but a beam direction of the inner-loop beam has a difference within a specific threshold compared with a beam direction of the outer-loop beam, and the threshold may be defined according to a practical requirement, such as 10 degrees or 20 degrees, or beam directions of an outer-loop beam and a corresponding inner-loop beam are the same or phases have a deviation within a specific threshold, and a beam width of the inner-loop beam is larger or smaller than a beam width of the outer-loop beam. One inner-loop beam may be corresponding to more than one outer-loop beam, or one outer-loop beam is corresponding to more than one inner-loop beam.

Figure 5:
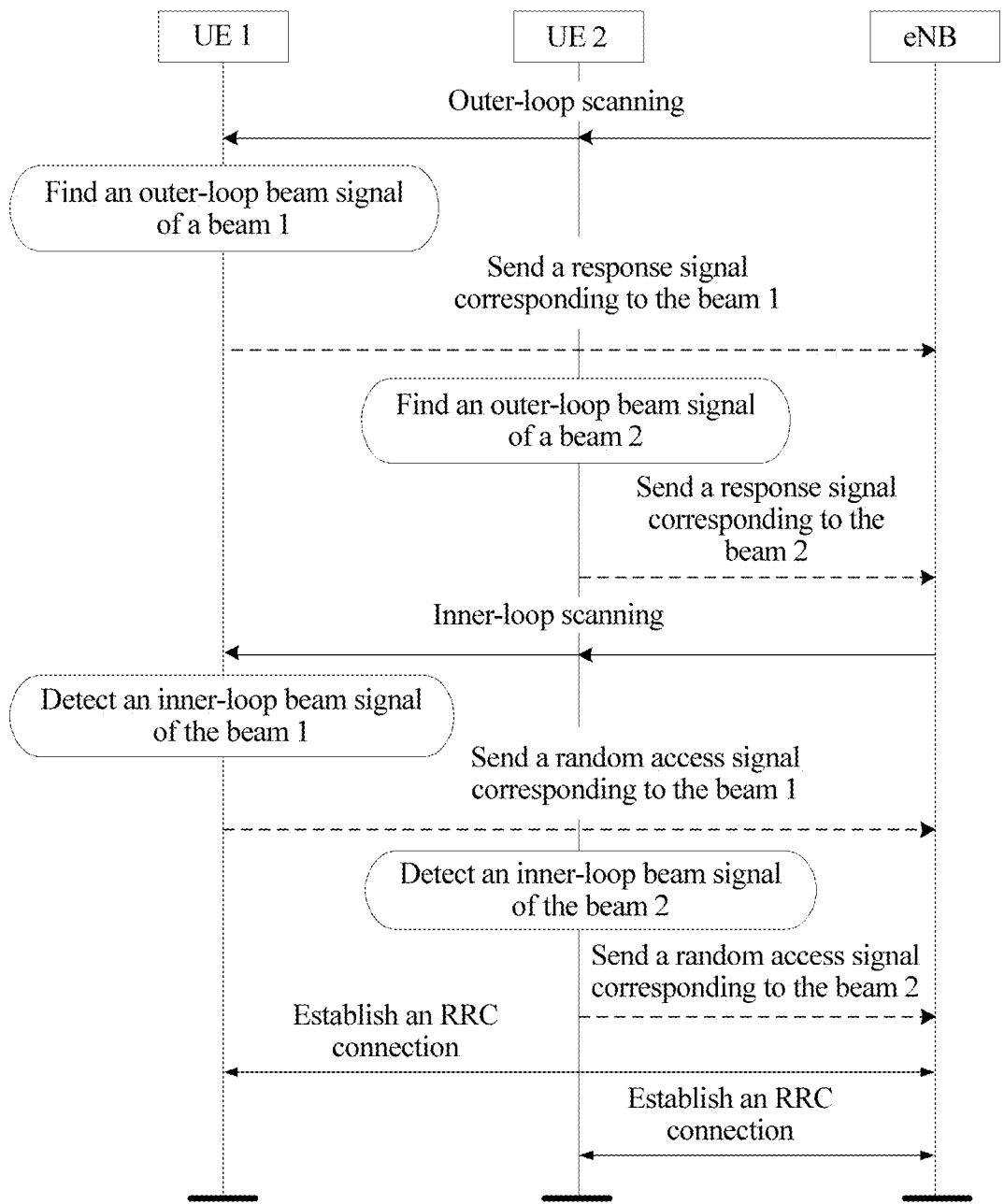
FIG. 5 is a schematic diagram of a double-loop beam access procedure according to an embodiment.

As shown in FIG. 5, a specific procedure may be as follows.

S101. A base station initiates outer-loop beam scanning.

An objective of the outer-loop beam scanning lies in that full spatial scanning is performed on cell coverage. The base station may achieve a full scanning objective by sending an outer-loop beam signal in each beam. It can be understood that full scanning is performed according to an operator requirement. The full scanning is a theoretical concept, and does not mean that there is no seam or no dead angle.

S102. UE feeds back a response for a received outer-loop beam signal.

An objective of a response feedback lies in enabling the base station to learn beams in which inner-loop beam scanning should be performed. Specifically, the UE may notify the base station of information about an outer-loop beam in which an outer-loop beam signal received by the UE is located, or the UE notifies, according to a correspondence between an outer-loop beam and an inner-loop beam, the base station of information about an inner-loop beam that is corresponding to an outer-loop beam in which an outer-loop beam signal received by the UE is located.

Further, the UE may selectively perform a feedback on the received outer-loop beam signal according to a particular principle. For example, to ensure that the UE can subsequently communicate with the base station, the UE may perform a feedback according to strength of the received outer-loop beam signal. The response is fed back only when the strength is greater than a threshold. A specific principle may be set according to a specific status of the outer-loop beam signal, and is described subsequently. Details are not described herein.

Optionally, the UE may feed back a response after receiving an outer-loop beam signal of a beam, or may select, according to a particular principle after receiving outer-loop beam signals of several beams (for example, within a particular measurement time), at least one beam to feed back a response, or may select, according to a particular principle after receiving all beams, at least one beam to feed back a response. The particular principle may be an optimal principle or another principle, and may be specifically set according to a system requirement. Details are not described herein.

S103. The base station initiates inner-loop beam scanning according to the response of the UE.

The base station may determine, according to outer-loop beam information fed back by one or more UEs, an inner-loop beam corresponding to the outer-loop beam information, or determine, according to inner-loop beam information fed back by the UE, an inner-loop beam corresponding to the inner-loop beam information. Specifically, the corresponding inner-loop beam may be determined according to the correspondence between an outer-loop beam and an inner-loop beam.

Further, the base station may selectively initiate inner-loop beam scanning in the determined inner-loop beam according to a particular principle.

A signal sent in the inner-loop beam scanning is referred to as an inner-loop beam signal.

To ensure that the response sent by the UE in S102 can be correctly received by the base station, in S101, an outer-loop beam signal that is of each beam and that is sent by the base station at least includes a synchronization signal. If the inner-loop beam scanning is synchronized with the outer-loop beam scanning in terms of time, the inner-loop beam signal may not include the synchronization signal. However, to improve synchronization performance, the inner-loop beam signal may also include the synchronization signal even if the inner-loop beam scanning is synchronized with the outer-loop beam scanning in terms of time.

A combination set (which is referred to as a signal set that is used for access) of the outer-loop beam signal and the inner-loop beam signal may include all signals required by UE for wireless access, such as a synchronization signal, a broadcast signal, a system message, and a measurement pilot signal, so that the UE completes wireless access. A specific manner of allocating these signals to the outer-loop beam signal and the inner-loop beam signal may be determined according to a practical situation, and is described in detail in subsequent embodiments of the present invention, but is not construed as a limitation to the solution in this embodiment.

Further, the procedure may further include the following step.

S104. The UE initiates a random access process, and establishes an RRC connection to the base station.

The UE usually initiates the random access process when there is a service requirement. The service requirement generally refers to a mobile originated service or a mobile terminated service (a voice or data service) of a circuit switched (CS) domain or a packet switched (PS) domain.

UE in an idle mode usually enters a connected mode after establishing the RRC connection to the base station, or when no service is sent in a period of time, UE in a connected mode releases the RRC connection, and enters an idle mode.

Content of an outer-loop beam signal and an inner-loop beam signal

Both an outer-loop beam signal and an inner-loop beam signal may include multiple types of signals, and each type of signal may include multiple information fields (information field). In this embodiment of the present invention, the outer-loop beam signal is referred to as a first signal set, and the first signal set may include one or more signals. The inner-loop beam signal is referred to as a second signal set, and the second signal set may include one or more signals. For differentiation, "first" or "outer-loop" is added before a signal in the first signal set, and "second" or "inner-loop" is added before a signal in the second signal set. In this embodiment of the present invention, either of "first" and "outer-loop" may be used, and the two indicate a consistent meaning when a difference between the two is not emphasized. Similarly, either of "second" and "inner-loop" may be used, and the two indicate a consistent meaning when a difference between the two is not emphasized.

A combination set (which is referred to as a signal set that is used for access) of the first signal set and the second signal set may include all signals required by UE for wireless access, such as a synchronization signal, a broadcast signal, a system message, and a measurement pilot signal, so that the UE completes wireless access.

The synchronization signal is used to implement at least one of time synchronization or frequency synchronization. The measurement pilot signal is used to perform channel estimation, so as to perform radio resource management (RRM) measurement. The broadcast signal is used to broadcast some most important and common transmission parameters. The system message is used to send some system configuration information.

It should be noted that in this embodiment of the present invention, both comparison between different first signal sets and comparison between the first signal set and the second signal set indicate comparison between signals that have a same function type.

A synchronization signal is necessary in the first signal set due to a communication requirement, and is marked as M in the following table. However, because the system message needs maximum signaling overheads, the first signal set is delivered in each beam, and the second signal set is selectively delivered. To reduce the signaling overheads, the system message or most information in the system message may be delivered in the second signal set. Therefore, it may be considered that the system message is necessary in the second signal set, and is also marked as M in the following table. Other included information is marked as 0.

Specifically, a first implementation is shown in Table 1. The first signal set includes a first synchronization signal, and the second signal set includes a second system message, a second synchronization signal, and a second broadcast signal.

TABLE 1

|  | First signal set (outer-loop beam signal) | Second signal set (outer-loop beam signal) |
| --- | --- | --- |
| Synchronization signal | M | O |
| System message |  | M |
| Broadcast signal |  | O |
| Measurement pilot signal |  |  |

In this manner, synchronization signals are delivered in both the first signal set and the second signal set, so that the UE performs synchronization.

A synchronization signal may be further used to perform channel estimation or measurement.

Reference may be made to subsequent description for resources (at least one of time resources, frequency resources, code resources, or space resources) used by signals included in the first signal set and the second signal set. The description includes but is not limited to designs of description of differentiation between an outer-loop beam signal and an inner-loop beam signal, an indication of outer-loop beam information, a resource of an outer-loop beam signal, a resource of an inner-loop beam signal, and the like.

For example, the differentiation between an outer-loop beam signal and an inner-loop beam signal is included. Optionally, a synchronization signal in the first signal set (which may be referred to as a first synchronization signal or an outer-loop synchronization signal) and a synchronization signal in the second signal set (which may be referred to as a second synchronization signal or an inner-loop synchronization signal) may be designed to be different. For example, a difference may include at least one of the following cases: sequences are different, primary synchronization signals (PSS) and secondary synchronization signals (SSS) that are included in the synchronization signals include different symbol spacings, sizes of time resources occupied by the synchronization signals are different, or sizes of frequency resources occupied by the synchronization signals are different. In this way, the UE may determine, according to a difference between detected synchronization signals, whether an outer-loop scanning process or an inner-loop scanning process is performed, so as to determine whether to feed back a response signal. If the outer-loop synchronization signal is determined, the UE feeds back the response signal, or if the inner-loop synchronization signal is determined, the UE does not feed back the response signal. Optionally, an outer-loop beam signal may be differentiated from an inner-loop beam signal in another manner (for details, refer to subsequent specific description), and the first synchronization signal and the second synchronization signal are designed to be the same.

A second implementation is shown in Table 2. The first signal set includes a first synchronization signal and a first measurement pilot signal, and the second signal set includes a second system message, a second synchronization signal, and a second broadcast signal. The first measurement pilot signal and the first synchronization signal are a same signal or different signals.

TABLE 2

|  | First signal set | Second signal set |
| --- | --- | --- |
| Synchronization signal | M | O |
| System message |  | M |
| Broadcast signal |  | O |
| Measurement pilot signal | O |  |

In this manner, synchronization signals are delivered in both the first signal set and the second signal set, so that the UE performs synchronization. A measurement pilot signal is delivered in the first signal set, so as to complete channel estimation (measurement).

A synchronization signal may be used in the second signal set to perform channel estimation (measurement). When it is found in a system design that beam measurement accuracy required by a system cannot be met because a synchronization signal is used to perform channel estimation (measurement), measurement may be performed by adding a dedicated measurement pilot signal.

Reference may be made to subsequent description for resources (at least one of time resources, frequency resources, code resources, or space resources) used by signals included in the first signal set and the second signal set. The description includes but is not limited to designs of description of differentiation between an outer-loop beam signal and an inner-loop beam signal, an indication of outer-loop beam information, a resource of an outer-loop beam signal, a resource of an inner-loop beam signal, and the like. Details are not described herein.

A third implementation is shown in Table 3. The first signal set includes a first synchronization signal and a first measurement pilot signal, and the second signal set includes a second system message, a second synchronization signal, a second broadcast signal, and a second measurement pilot signal. The first measurement pilot signal and the first synchronization signal are a same signal or different signals. The second synchronization signal and the second measurement pilot signal are a same signal or different signals.

TABLE 3

|  | First signal set | Second signal set |
| --- | --- | --- |
| Synchronization signal | M | O |
| System message |  | M |
| Broadcast signal |  | O |
| Measurement pilot signal | O | O |

In this manner, both the first signal set and the second signal set include a synchronization signal, so that the UE performs synchronization. Measurement pilot signals are delivered in both the first signal set and the second signal set, so as to complete channel estimation (measurement).

Reference may be made to subsequent description for resources (at least one of time resources, frequency resources, code resources, or space resources) used by signals included in the first signal set and the second signal set. The description includes but is not limited to designs of description of differentiation between an outer-loop beam signal and an inner-loop beam signal, an indication of outer-loop beam information, a resource of an outer-loop beam signal, a resource of an inner-loop beam signal, and the like. Details are not described herein.

A fourth implementation is shown in Table 4. The first signal set includes a first synchronization signal, a first measurement pilot signal, and a first broadcast signal, and the second signal set includes a second synchronization signal, a second broadcast signal, and a second system message. The first measurement pilot signal and the first synchronization signal are a same signal or different signals.

TABLE 4

|  | First signal set | Second signal set |
| --- | --- | --- |
| Synchronization signal | M | O |
| System message |  | M |
| Broadcast signal | O | O |
| Measurement pilot signal | O | O |

In this manner, both the first signal set and the second signal set include a synchronization signal, so that the UE performs synchronization. The first signal set includes a measurement pilot signal, so as to complete channel estimation (measurement). A synchronization signal may be used in the second signal set to perform channel estimation (measurement). When it is found in a system design that beam measurement accuracy required by a system cannot be met because a synchronization signal is used to perform channel estimation (measurement), measurement may be performed by adding a dedicated measurement pilot signal.

Both the first signal set and the second signal set include a broadcast signal. Content included in the first broadcast signal and the second broadcast signal may be the same, or may be different.

Optionally, when information about a resource used for sending a response signal is delivered by using an outer-loop beam signal, where the resource is, for example, at least one of a time resource, a frequency resource, a code resource, or a space resource, the information may be delivered by using the first broadcast signal, that is, the first broadcast signal may include the information about the resource used for sending the response signal. For a specific design in which the information about the resource used for sending the response signal is delivered by using the outer-loop beam signal, refer to some subsequent description in this embodiment of the present invention. The description includes but is not limited to description of a response feedback.

Optionally, when information about a resource used for sending an inner-loop beam signal is delivered by using an outer-loop beam signal, where the resource is, for example, at least one of a time resource, a frequency resource, a code resource, or a space resource, the information may be delivered by using the first broadcast signal, that is, the first broadcast signal may include the information about the resource used for sending the inner-loop beam signal. For a specific design in which the information about the resource used for sending the inner-loop beam signal is delivered by using the outer-loop beam signal, refer to some subsequent description in this embodiment of the present invention. The description includes but is not limited to description of a resource of an inner-loop beam signal.

Optionally, the first broadcast signal may further include at least one of downlink bandwidth information, information about a system frame number (SFN), a transmit antenna port, a beam pattern, or a padding bit. A system frame may be a radio frame in this embodiment of this application.

Optionally, the downlink bandwidth information may indicate information such as 250M, 500M, or 1G, and occupies two bits.

Optionally, the SFN occupies 10 bits.

Optionally, the transmit antenna port may indicate information such as 2Tx or 4Tx, and occupies one 1 bit.

Optionally, the beam pattern occupies 12 bits (a bit map manner may be used).

Optionally, the first broadcast signal may further include a padding bit (padding bits). For example, the first broadcast signal may occupy seven bits. The second broadcast signal may also include a padding bit.

Optionally, a padding bit may be used to differentiate whether a signal is an outer-loop broadcast signal or an inner-loop broadcast signal. For example, if the padding bit is 0000000000, the signal is an inner-loop broadcast signal, and correspondingly, the UE does not need to feed back a response signal, or if the padding bit is non-zero, the signal is an outer-loop broadcast signal, and correspondingly, the UE needs to feed back a response signal.

Optionally, when a padding bit in an outer-loop broadcast signal is non-zero, the padding bit may be used to indicate a sequence of a response signal.

Figure 6A:
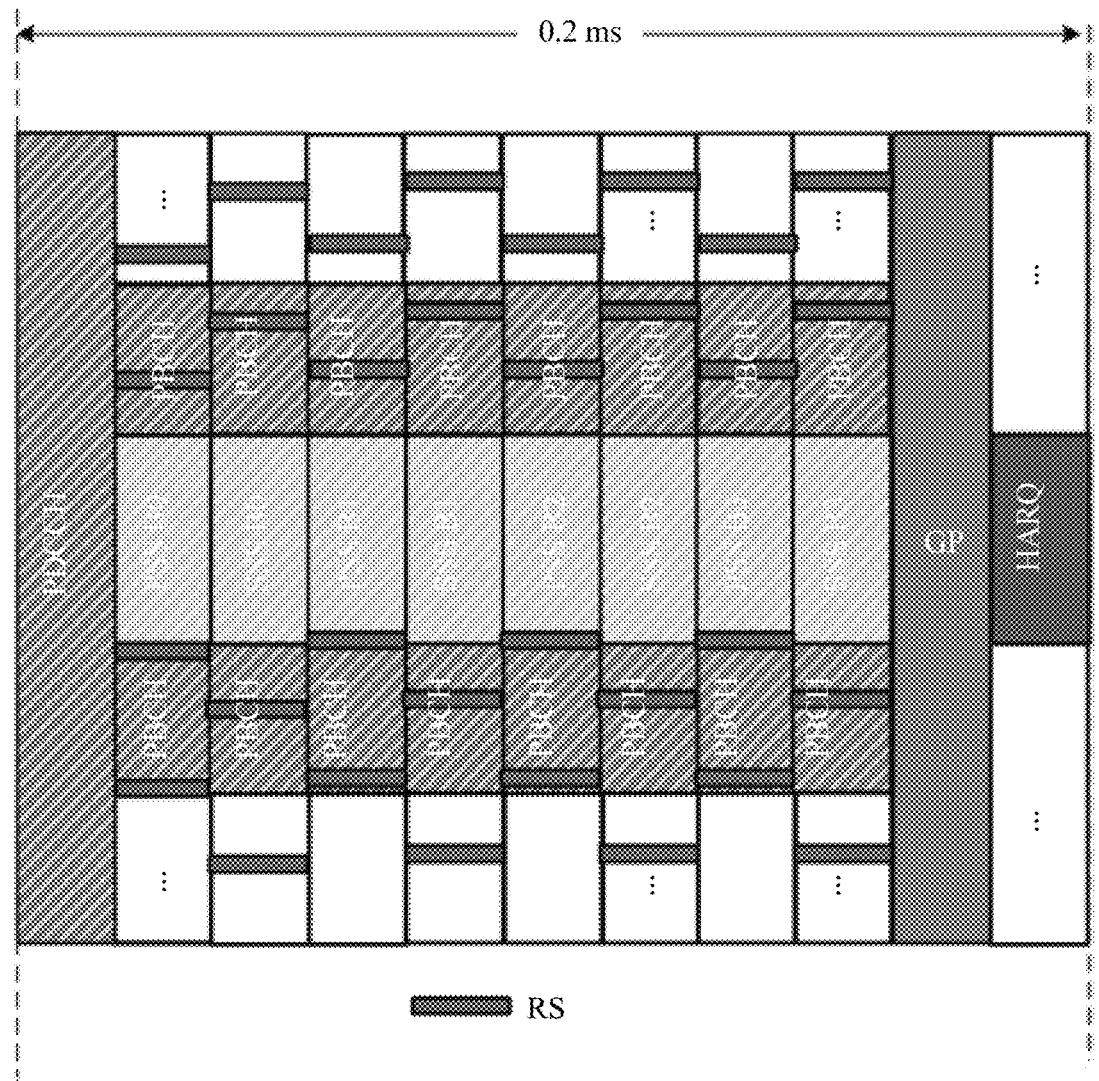
FIG. 6a is a schematic diagram of a time-frequency resource according to an embodiment.

Optionally, in a design, if the first broadcast signal includes 32 bits (for example, a sum of bits of the signals listed above), the first broadcast signal may be modulated into 48 symbols by means of ⅓ encoding and quadrature phase shift keying (QPSK), and occupies four PRBs in a frequency domain. For example, as shown in FIG. 6a, when the first synchronization signal includes a PSS and an SSS, and a PSS and an SSS included in a synchronization signal of a same beam occupy two adjacent OFDM symbols, the foregoing four PRBs may be repeated several times, for example, fourfold, and are respectively mapped to four PRBs above and four PRBs below the PSS and the SSS of the same beam. Optionally, as shown in FIG. 6b, when the first synchronization signal includes a PSS and an SSS, and a PSS and an SSS included in a synchronization signal of a same beam occupy one OFDM symbol, the first broadcast signal may be designed as a symbol adjacent to the OFDM symbol. The first synchronization signal and the first broadcast signal may occupy a same frequency resource. The PSS and the SSS are transmitted on a same symbol, and are sent in a manner in which different subcarriers are interlaced in a frequency domain.

Optionally, information sent on a first broadcast signal included in an outer-loop beam signal corresponding to each outer-loop beam may be the same, or may be different.

Optionally, an outer-loop broadcast signal and an inner-loop broadcast signal may be designed as where data packet sizes may be different, or data packet sizes are the same, but carried information is different, or data packet sizes are the same, and carried information is the same, but used scrambling codes are different, or data packet sizes are the same, carried information is the same, but masks scrambling CRC of data packets are different.

Specifically, the outer-loop broadcast signal and the inner-loop broadcast signal may be designed according to a system requirement. In addition, a difference between the outer-loop broadcast signal and the inner-loop broadcast signal may be used to differentiate outer-loop beam scanning from inner-loop beam scanning. For this part, refer to subsequent description. The description includes but is not limited to differentiation between an outer-loop beam signal and an inner-loop beam signal. Details are not described herein.

Reference may be made to subsequent description for resources (at least one of time resources, frequency resources, code resources, or space resources) used by signals included in the first signal set and the second signal set. The description includes but is not limited to designs of description of differentiation between an outer-loop beam signal and an inner-loop beam signal, an indication of outer-loop beam information, a resource of an outer-loop beam signal, a resource of an inner-loop beam signal, and the like. Details are not described herein.

A fifth implementation is shown in Table 5. The first signal set includes a first synchronization signal, a first measurement pilot signal, and a first broadcast signal, and the second signal set includes a second system message, a second synchronization signal, a second broadcast signal, and a second measurement pilot signal. The first measurement pilot signal and the first synchronization signal are a same signal or different signals. The second synchronization signal and the second measurement pilot signal are a same signal or different signals.

TABLE 5

|  | First signal set | Second signal set |
| --- | --- | --- |
| Synchronization signal | M | O |
| System message |  | M |
| Broadcast signal | O | O |
| Measurement pilot signal | O | O |

In this manner, both the first signal set and the second signal set include a synchronization signal, so that the UE performs synchronization. Both the first signal set and the second signal set include a measurement pilot signal, so as to complete channel estimation (measurement).

Both the first signal set and the second signal set include a broadcast signal. Content included in the first broadcast signal and the second broadcast signal may be the same, or may be different. For a specific design of the first broadcast signal and the second broadcast signal, refer to a design of the first broadcast signal and the second broadcast signal in Table 4 and description of another part in this embodiment of the present invention.

Differentiation Between an Outer-Loop Beam Signal and an Inner-Loop Beam Signal

Differentiation Manner

According to the foregoing description, it can be learned that a combination set of an outer-loop beam signal and an inner-loop beam signal may include a signal set that is used for access. The outer-loop beam signal may include several signals that are used for access (first signals that are used for access), and some signals may include several information fields. The inner-loop beam signal may also include several signals that are used for access (second signals that are used for access), and some signals may include several information fields.

Optionally, the outer-loop beam signal may be differentiated from the inner-loop beam signal by using a difference between a first signal that is used for access and a second signal that is used for access. The first signal that is used for access and the second signal that is used for access have a same function type. The difference may include at least one of the following cases: data packet sizes are different, carried information is different, scrambling codes are different, sequences are different, masks scrambling cyclic redundancy check (CRC) codes of data packets are different, time resource sizes are different, frequency resource sizes are different, relative time resources between included information fields of signals are different, or relative frequency resources between included information fields are different. There may be other different manners, and details are not described herein. When the UE determines that a signal that is used for access is an outer-loop beam signal, the UE may determine that both the signal and a signal that is located in a same beam time domain as the signal are outer-loop beam signals. When the UE determines that a signal that is used for access is an inner-loop beam signal, the UE may determine that both the signal and a signal that is located in a same beam time domain as the signal are inner-loop beam signals.

For example, both the outer-loop beam signal and the inner-loop beam signal include a broadcast signal, that is, when the first signal that is used for access and the second signal that is used for access are a first broadcast signal and a second broadcast signal respectively, it may be determined whether a signal is an outer-loop beam signal or an inner-loop beam signal by using a difference between the first broadcast signal and the second broadcast signal. Specifically, it may be determined whether a signal is an outer-loop beam signal or an inner-loop beam signal by determining that the difference between the first broadcast signal and the second broadcast signal includes at least one of the following cases: data packet sizes are different, or data packet sizes are the same, but carried information is different, or data packet sizes are the same, and carried information is the same, but used scrambling codes are different, or data packet sizes are the same, and carried information is the same, but masks scrambling CRC of data packets are different, or sizes of time-frequency resources used for transmitting the first broadcast signal and the second broadcast signal are different.

For example, both the outer-loop beam signal and the inner-loop beam signal include a synchronization signal, that is, when the first signal that is used for access and the second signal that is used for access are a first synchronization signal and a second synchronization signal respectively, the outer-loop beam signal may be differentiated from the inner-loop beam signal by using a difference between the first synchronization signal and the second synchronization signal. For example, the difference between the first synchronization signal and the second synchronization signal includes at least one of the following cases: (1) the first synchronization signal and the second synchronization signal use different sequences, (2) sizes of time-frequency resources used for transmission are different (that is, at least one of time resource sizes or frequency resource sizes are different), (3) a relative time resource between first synchronization signals (for example, a symbol spacing between an included first PSS and an included first SSS) is different from a relative time resource between second synchronization signals (for example, a symbol spacing between an included second PSS and an included second SSS), or (4) a frequency separation between a first PSS and a first SSS that are included in the first synchronization signal is different from a frequency separation between a second PSS and a second SSS that are included in the second synchronization signal.

Optionally, the outer-loop beam signal may be differentiated from the inner-loop beam signal by using a difference between frame numbers of signals.

For example, it is assumed that a set of time resources of an outer-loop beam signal is predefined as $\{F1_i\}$, i is an integer greater than or equal to 0 and less than or equal to P1, and P1 is a total quantity of time resources of the outer-loop beam signal, and a set of time resources of an inner-loop beam signal is $\{F2_j\}$, j is an integer greater than or equal to 0 and less than or equal to P2, and P2 is a total quantity of time resources of the outer-loop beam signal. In this case, if a time resource is a radio frame, and the UE is notified of a frame number E by using the outer-loop beam signal, the UE may determine whether E belongs to $\{F1_i\}$ or $\{F2_j\}$, so as to determine whether a signal is an inner-loop beam signal or an outer-loop beam signal. If the signal is an outer-loop beam signal, a response signal is sent when a particular feedback condition is met, or if the signal is an inner-loop beam signal, a response signal is not sent.

Optionally, the outer-loop beam signal may be differentiated from the inner-loop beam signal by using a case in which either the outer-loop beam signal or the inner-loop beam signal includes a signal of a function type. For example, if the outer-loop beam signal includes a synchronization signal, but the inner-loop beam signal does not include a synchronization signal, when the UE determines that a received signal is a synchronization signal, the UE may determine that the signal and another signal that is located in a same beam time domain as the signal are outer-loop beam signals.

Optionally, the outer-loop beam signal may be differentiated from the inner-loop beam signal by using included different dedicated beam identifiers (beam ID). This manner may be considered as explicit differentiation, and the foregoing mentioned differentiation by using a signal set that is used for access or by using a signal of a function type may be considered as implicit differentiation. The different dedicated beam identifiers include at least one of the following cases: sequences of dedicated beam identifiers are different, or time-frequency resource sizes of dedicated beam identifiers are different. The dedicated beam identifiers may be different in another manner, and details are not described herein.

Differentiation Objective

By differentiating an outer-loop beam signal from an inner-loop beam signal, the UE may identify whether a received signal is an outer-loop beam signal or an inner-loop beam signal, so as to perform different feedbacks.

When the signal received by the UE is an outer-loop beam signal, the UE feeds back the response in S102.

When the signal received by the UE is an inner-loop beam signal, the UE does not feed back the response in S102.

When the UE is in an idle mode, and the signal received by the UE is an outer-loop beam signal, the UE feeds back the response in S102. When the inner-loop beam signal includes a set of all signals used for access, after the UE receives the inner-loop beam signal, the UE may initiate random access when access is required, so as to establish an RRC connection to the base station. When the inner-loop beam signal does not include a set of all signals used for access, after the UE receives the inner-loop beam signal and the outer-loop beam signal, the UE may initiate random access when access is required, so as to establish an RRC connection to the base station.

When the UE is in a connected mode, and the received signal is an outer-loop beam signal, the UE feeds back the response in S102. When the received signal is an inner-loop beam signal, the UE may ignore the inner-loop beam signal. When the UE is out of synchronization or needs to perform cell reselection, the UE may perform a corresponding process according to the received inner-loop beam signal.

Resource of an Outer-Loop Beam Signal

A resource of an outer-loop beam signal may include at least one of a space resource, a time resource, a frequency resource, or a code resource.

In terms of space resource, as mentioned in S101, the base station may achieve a full scanning objective by sending an outer-loop beam signal in each beam. For example, a beam quantity is N and there are N outer-loop beam signals. Because an outer-loop beam signal needs to be sent in each beam, in this embodiment of the present invention, a space resource for sending an outer-loop beam signal is fixed in terms of theoretical perspective, that is, a set of space resources corresponding to the N beams. It can be understood that due to operation deviation (such as an inartificial antenna phase change) of the base station, a subtle change occurs on the set of space resources corresponding to the N beams, and this case is included in a fixed case in this embodiment. For each beam, if the operation deviation is not considered or according to a requirement adjustment (for example, an antenna phase adjustment or a beam quantity adjustment), a space resource corresponding to each beam is also fixed.

Figure 7A:
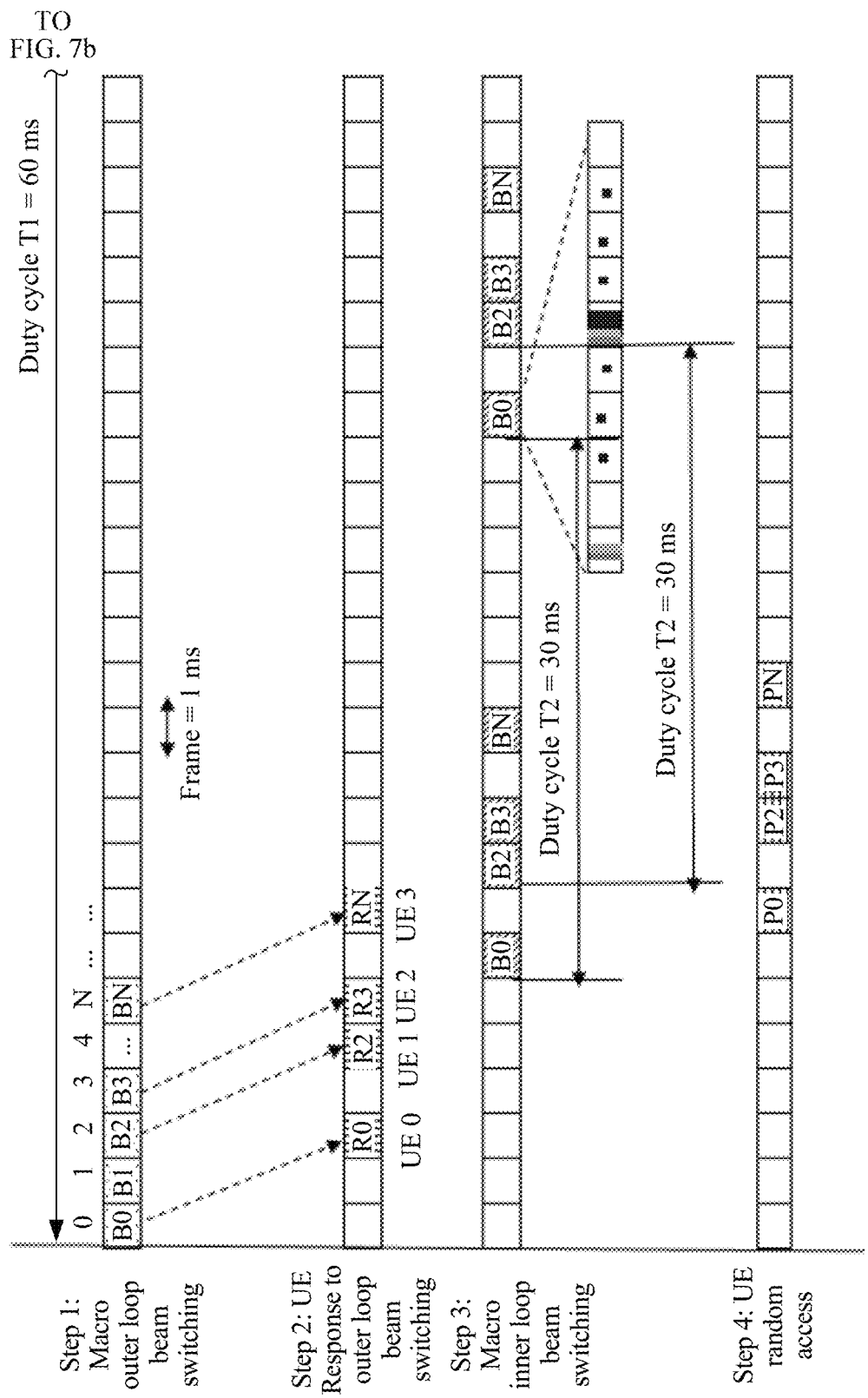
FIG. 7a and FIG. 7b are a schematic diagram of a time order of a double-loop beam access procedure according to an embodiment.
Figures 7A, 7B:
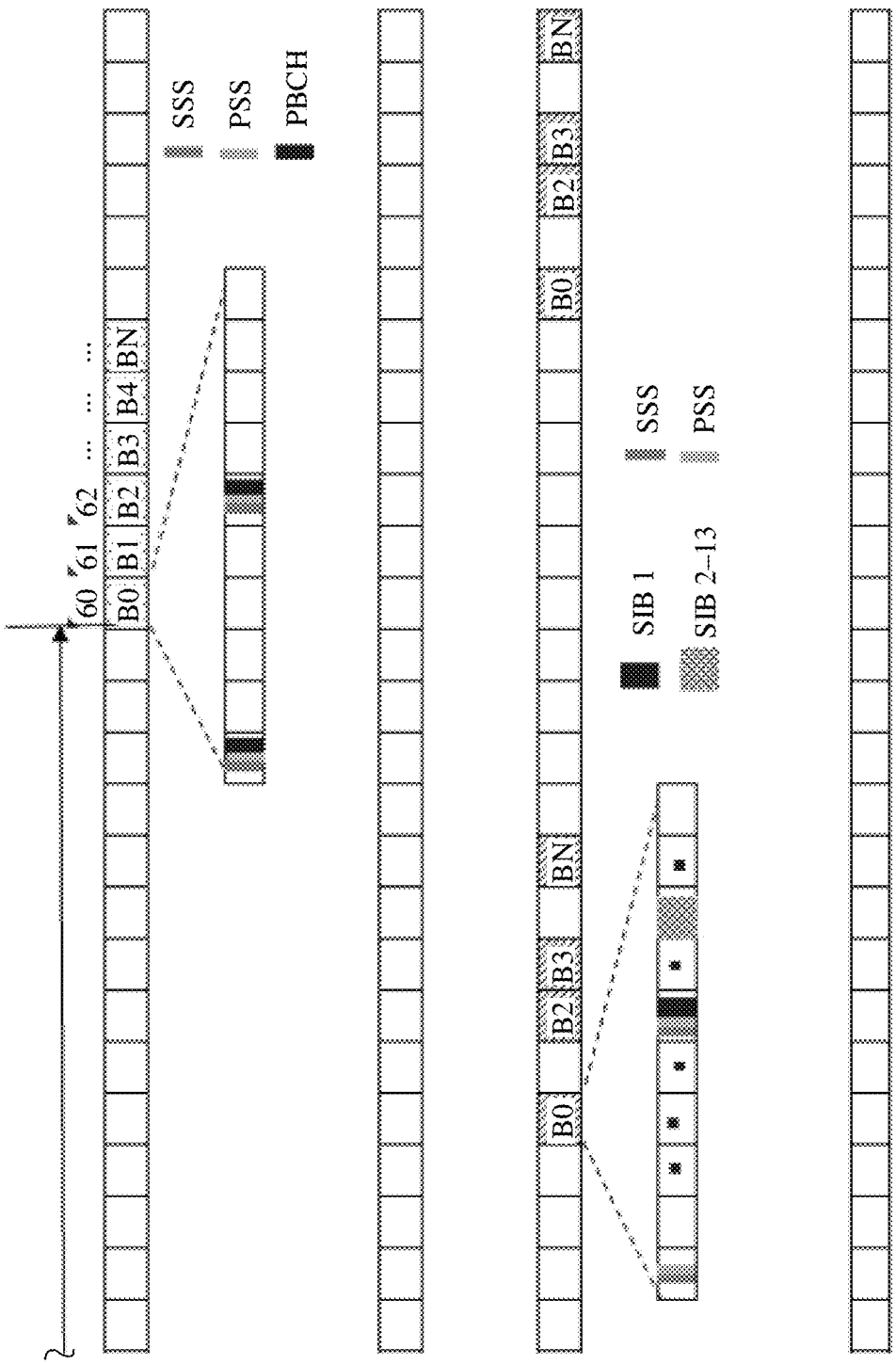

In terms of time resource, outer-loop beam signals are sent on N time resources, and N is constant. As shown in FIG. 7, a period of sending an outer-loop beam signal is T1 (that is, a period of sending a signal of a function type in the outer-loop beam signal is T1).

Optionally, within a time period T1, N outer-loop beam signals are sent in at least one contiguous radio frame.

Optionally, within a time period T1, only one outer-loop beam signal is sent in one radio frame, or at least two outer-loop beam signals are sent in one radio frame. A beam switch point exists between each two outer-loop beam signals. In a frame structure, one beam switch point may be corresponding to one timeslot (GP). Each two adjacent beam switch points in the frame structure define a beam time domain. GP is used as a guard time.

Optionally, relative locations of subframes occupied in different radio frames by each outer-loop beam signal are the same, or relative locations of symbols occupied in different subframes by each outer-loop beam signal are the same.

Figure 8A:
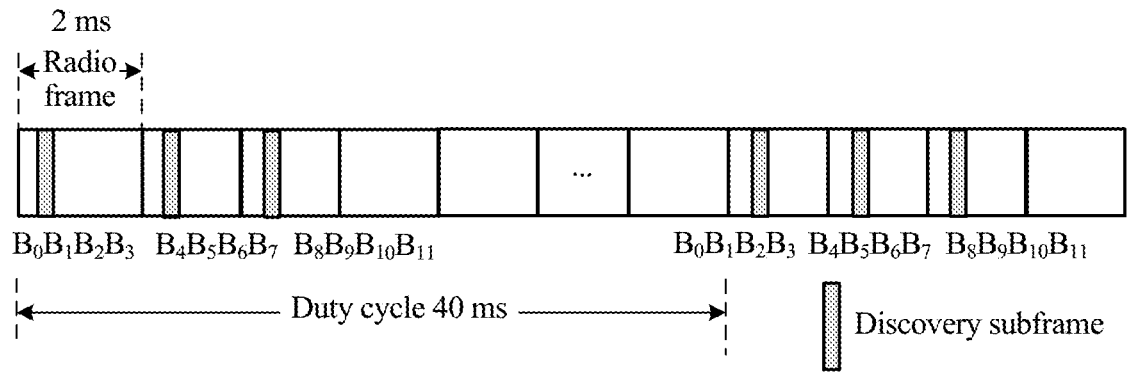
FIG. 8a is a schematic diagram of a time order of a discovery subframe according to an embodiment.
Figure 8B:
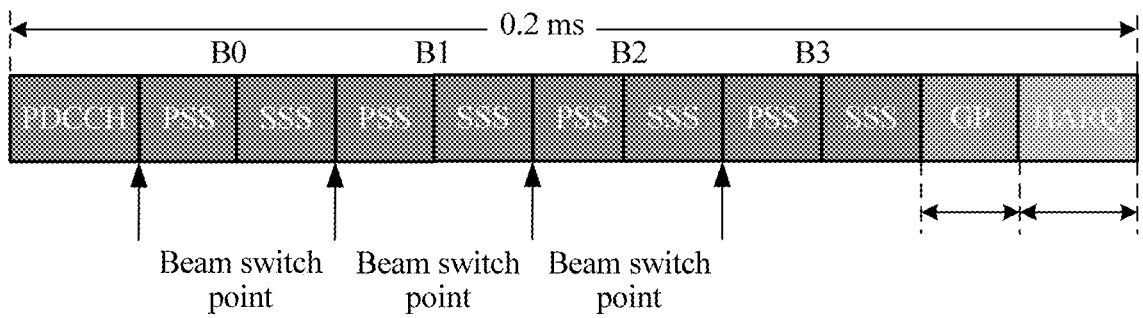
FIG. 8b is a schematic structural diagram of a subframe of an outer-loop beam signal according to an embodiment.

For example, as shown in FIG. 8a, a radio frame is 2 ms, four outer-loop beam signals are sent in each radio frame, and each radio frame includes 10 subframes (each subframe is 0.2 ms). As shown in FIG. 8b, each subframe may support sending of four beams. Assuming that all users can be covered only when 12 beams are traversed in a cell, as shown in FIG. 8a, an outer-loop beam signal is sent in the second subframe in the first radio frame by using B0-B3, and an outer-loop beam signal is sent in the second subframe in the second radio frame by using B4-B7. In this case, three radio frames are required to scan 12 beams. Another outer-loop beam signal is sent after a first outer-loop beam signal is sent in a period T1. Correspondingly, a subframe in which an outer-loop beam signal is sent may be referred to as a discovery subframe. It can be learned that in this embodiment, a location of the discovery subframe is fixed in a radio frame. FIG. 8b shows a discovery subframe in a case in which an outer-loop beam signal is sent in the second subframe in the first radio frame by using the beams B0-B3. The discovery subframe includes 11 symbols in total, and the subframe includes four outer-loop beam signals. Each outer-loop beam signal includes a synchronization signal formed by a PSS and an SSS. Specifically, the second symbol and the third symbol are a PSS and an SSS corresponding to B0, the fourth symbol and the fifth symbol are a PSS and an SSS corresponding to B1, the sixth symbol and the seventh symbol are a PSS and an SSS corresponding to B2, and the eighth symbol and the ninth symbol are a PSS and an SSS corresponding B3.

Optionally, when the outer-loop beam signal includes a synchronization signal, and each synchronization signal includes a PSS (primary synchronization signal) and an SSS (secondary synchronization signal), the PSS and the SSS may be located in different symbols in the frame structure, such as adjacent symbols or two symbols at an interval of one symbol. In this case, the PSS and the SSS may be located on a same frequency resource. In another manner, the PSS and the SSS may be located on a same symbol in the frame structure. In this case, the PSS and the SSS are located on different frequency resources.

Optionally, when the synchronization signal included in the outer-loop beam signal includes the PSS and the SSS, and the outer-loop beam signal further includes a broadcast signal, in an implementation, the PSS and the SSS that are included in the synchronization signal are located on adjacent symbols in the frame structure and are located on a same frequency resource, the broadcast signal and the synchronization signal are located on a same symbol in the frame structure, and the broadcast signal and the synchronization signal are located on different frequency resources. In another implementation, the PSS and the SSS that are included in the synchronization signal are located on a same symbol in the frame structure and are located on different frequency resources, the broadcast signal and the synchronization signal are located on different symbols (such as adjacent symbols) and are located on a same frequency resource.

Optionally, occupation of a frequency resource of an outer-loop beam signal may be set according to a practical system requirement, and is not limited herein.

Optionally, in terms of code resource, a code resource used by an outer-loop beam signal may be set according to a practical system requirement, and is not limited herein. When a synchronization signal included in the outer-loop beam signal includes a PSS and an SSS, for example, the PSS may use 3×12 NID1 sequences, or may use another sequence, and the SSS may use 168 sequences that are the same as those in an LTE protocol, or may use another sequence. This is not limited herein. An NID1 may be a beam ID.

Optionally, a PSS sequence may use a ZC sequence, and an expression formula is shown below. A sequence includes n elements, u is a root sequence index, and values of an NID1 and u or a correspondence between an NID1 and u is shown in the following table.

$$d_u(n) = \begin{cases} e^{-j\frac{\pi u n(n+1)}{67}} & n = 0, 1, \ldots, 30 \\ e^{-j\frac{\pi u(n+1)(n+2)}{67}} & n = 31, 32, \ldots, 61 \end{cases}$$

| NID1 | Root sequence u |
|---|---|
| 0 | 0 |
| 1 | 1 |
| 2 | 2 |
| 3 | 4 |
| 4 | 6 |
| 5 | 8 |
| 6 | 10 |
| 7 | 12 |
| 8 | 14 |
| 9 | 16 |
| 10 | 18 |
| 11 | 20 |
| 12 | 22 |
| 13 | 24 |
| 14 | 26 |
| 15 | 28 |
| 16 | 30 |
| 17 | 32 |
| 18 | 33 |
| 19 | 35 |
| 20 | 36 |
| 21 | 38 |
| 22 | 40 |
| 23 | 42 |
| 24 | 44 |
| 25 | 46 |
| 26 | 48 |
| 27 | 50 |
| 28 | 52 |
| 29 | 54 |
| 30 | 56 |
| 31 | 58 |
| 32 | 60 |
| 33 | 62 |
| 34 | 64 |
| 35 | 66 |

Indication of Outer-Loop Beam Information

It can be learned from S102 that an objective of a response feedback lies in enabling the base station to learn beams in which inner-loop beam scanning should be performed. Specifically, the UE may notify the base station of information about an outer-loop beam in which an outer-loop beam signal received by the UE is located, or the UE notifies, according to a correspondence between an outer-loop beam and an inner-loop beam, the base station of information about an inner-loop beam that is corresponding to an outer-loop beam in which an outer-loop beam signal received by the UE is located. Regardless of whether the UE feeds back outer-loop beam information or inner-loop beam information, the UE needs to learn the information about the outer-loop beam in which the outer-loop beam signal received by the UE is located.

A manner of indicating outer-loop beam information may include carrying, by using an outer-loop beam signal, indication information of a resource on which the outer-loop beam signal is located.

Optionally, the manner may specifically include carrying, in each outer-loop beam signal, indication information of a space resource on which the outer-loop beam signal is located, where at least one of a time resource, a frequency resource, or a code resource used by at least one signal in each outer-loop beam signal is corresponding to the space resource on which the outer-loop beam signal is located; and obtaining a corresponding outer-loop beam identifier (ID) by means of calculation according to the at least one of the time resource, the frequency resource, or the code resource used by the at least one signal in the outer-loop beam signal, where the outer-loop beam ID may be used to obtain a resource used by a subsequent response signal, and/or may be used to obtain a resource used by a subsequent inner-loop beam signal.

The at least one signal in each outer-loop beam signal may be a signal in a signal set that is used for access, or may be a dedicated space resource identification signal (or may be referred as a dedicated beam identification signal).

The used time resource is corresponding to the space resource, that is, an outer-loop beam signal sent in each beam occupies a fixed relative location in a frame structure. In this way, information about an outer-loop beam in which an outer-loop beam signal is located can be learned by using a system frame number and a symbol location.

The used code resource is corresponding to the space resource, that is, a signal is corresponding to the space resource, for example, a synchronization signal in a signal set that is used for access. Different outer-loop beams use different encoded synchronization signals or different dedicated beam identification signals, and different outer-loop beams use dedicated beam identification signals with different sequences. Generally, different outer-loop beams use different beam IDs.

The used frequency resource is corresponding to the space resource, and this is reflected by different outer-loop beams. Signals of a same function type in an outer-loop beam signal use different frequency resources.

Generally, indication by a dedicated beam identification signal may be considered as explicit indication, and indication by a signal in a signal set that is used for access may be considered as implicit indication.

Response Feedback (1) Condition

As mentioned in S102, the UE may selectively perform a feedback on a received outer-loop beam signal according to a particular rule, that is, a response feedback condition.

For example, the feedback condition may be a peak of a first synchronization signal in a first signal set exceeds a preset threshold; or when a first signal set at least includes a first synchronization signal and a first measurement pilot signal, a peak of the first synchronization signal exceeds a preset threshold, and an RSRP of the first measurement pilot signal exceeds a preset threshold; or when a first signal set at least includes a first synchronization signal, a first measurement pilot signal, and a first broadcast signal, a peak of the first synchronization signal exceeds a preset threshold, an RSRP of the first measurement pilot signal exceeds a preset threshold, and the first broadcast signal is correctly demodulated.

As further mentioned in S102, the UE may feed back, after receiving an outer-loop beam signal of a beam, a response according to the outer-loop beam signal, or may select, according to a particular rule after receiving outer-loop beam signals of several or all beams (for example, within a particular measurement time, or of a particular beam quantity), at least one beam to feed back a response. A specific policy may be determined and solidified at the beginning of a system design. For example, the specific policy may be determined by using a time resource used during response solidification, or may be determined by the UE according to configuration information carried in a received outer-loop beam signal. A time resource used by the UE for feeding back a response may also be determined according to the configuration information carried in the outer-loop beam signal. For example, the UE receives a measurement time T carried in a broadcast signal in the outer-loop beam signal. Within the measurement time T, the UE feeds back only a response corresponding to an optimal outer-loop beam signal.

(2) Resource

A resource used for a response feedback includes at least one of a used time resource, a used frequency resource, or a used code resource. When the UE also supports spatial multiplexing, the resource further includes a space resource.

In terms of time resource (that is, a location occupied in a frame structure), there are multiple optional response feedback implementations.

Figure 9A:
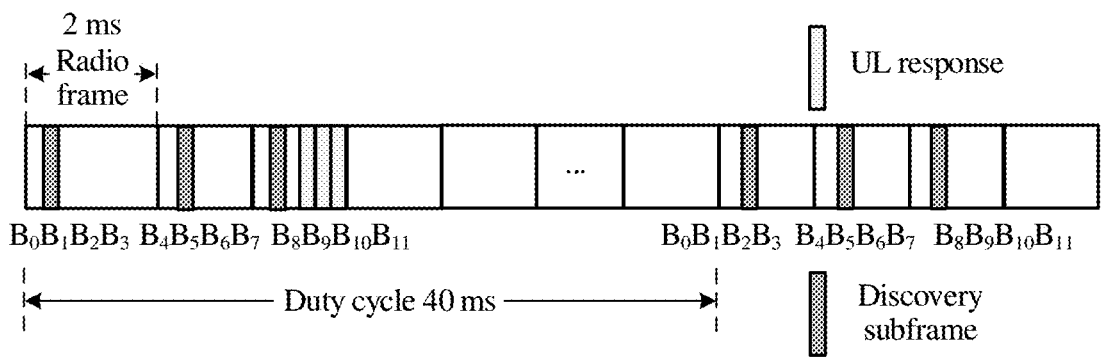
FIG. 9a is a schematic diagram of a time order of an outer-loop beam signal and a response signal according to an embodiment.

Manner 1: As shown in FIG. 9a, a response is fed back after all outer-loop beam signals are received.

In this manner, a response may be fed back by the UE according to one or more received outer-loop beam signals. For example, the UE may perform a feedback according to an outer-loop beam signal received within a period of time T, and the time T may be determined and solidified in a system, or may be delivered by using an outer-loop beam signal. The UE may select an optimal outer-loop beam signal from more than one received outer-loop beam signal to perform a corresponding feedback, or the UE may perform a corresponding feedback according to only the first received outer-loop beam signal, or select an optimal outer-loop beam signal from first several received outer-loop beam signals to perform a corresponding feedback. There may be another manner, and details are not described herein. It can be understood that the response herein may be a response fed back after the feedback condition in (i) is met.

Figure 9B:
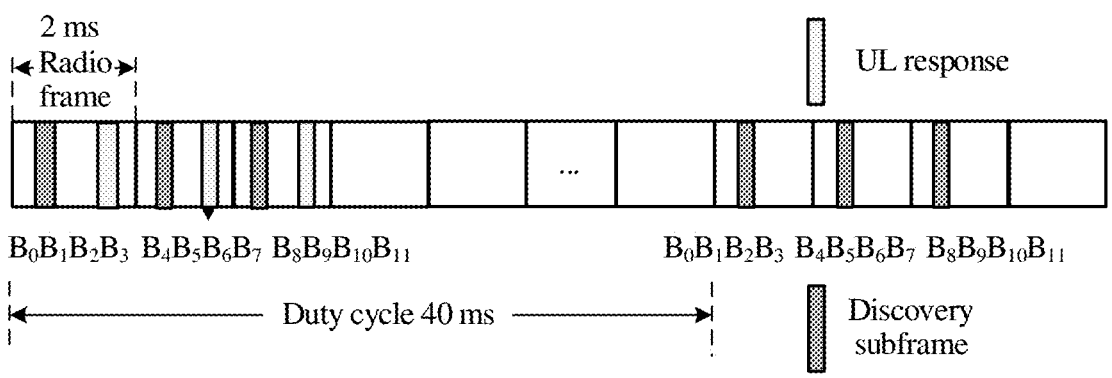
FIG. 9b is a schematic diagram of a time order of an outer-loop beam signal and a response signal according to an embodiment.

Manner 2: A response is fed back after some outer-loop beam signals are received and before some other outer-loop beam signals are received. For example, as shown in FIG. 9b, a response for B0-B3 is fed back after outer-loop beam signals of B0-B3 are received and before an outer-loop beam signal of B4 is received, and a subframe of the response for B0-B3 and a subframe in which outer-loop beam signals corresponding to B0 to B3 are located are in a same radio frame.

In this manner, a response may be fed back by the UE according to one or more received outer-loop beam signals. A difference between Manner 1 and Manner 2 lies in that due to a time order, an outer-loop beam signal received by the UE is an outer-loop beam signal sent before the response. As shown in FIG. 9b, responses after B0-B3 are fed back according to outer-loop beam signals delivered in B0-B3. For other content, refer to description in Manner 1.

In the frame structure, a response is described in a response signal manner.

Optionally, a resource (for example, at least one of a time resource, a frequency resource, or a code resource) of a response signal corresponding to each beam may be solidified during a system design, or may be carried in each outer-loop beam signal. For example, the resource is directly carried in a broadcast signal included in each outer-loop beam signal, or is obtained by the UE by means of calculation according to a received outer-loop beam signal, for example, by means of calculation according to a resource of the received outer-loop beam signal or a resource of a signal in the received outer-loop beam signal.

For example, a time-frequency resource location of sending a response signal is explicitly obtained by using a sequence of a synchronization signal corresponding to one of N detected beams. For example, if the UE determines, according to a feedback condition, that B2 in the first radio frame is an optimal beam, the UE determines, according to a sequence such as an ID2 corresponding to the synchronization signal, that a moment of feeding back a response signal by the UE is the fourth symbol and the fifth symbol of the eighth subframe in the third radio frame.

For example, by using a broadcast channel (PBCH) (a channel carrying a broadcast signal) in an outer-loop beam signal, the UE is notified of a time-frequency resource for feeding back a response signal.

Optionally, at a start sending point of a response signal, the response signal may be sent according to downlink timing of a synchronization signal included in an outer-loop beam signal.

Optionally, in the frame structure, a cyclic prefix of a response signal may be longer than a cyclic prefix of a normal subframe.

Optionally, in the frame structure, a cyclic prefix of a response signal may be equal to or shorter than a cyclic prefix of a random access channel.

Figure 10:
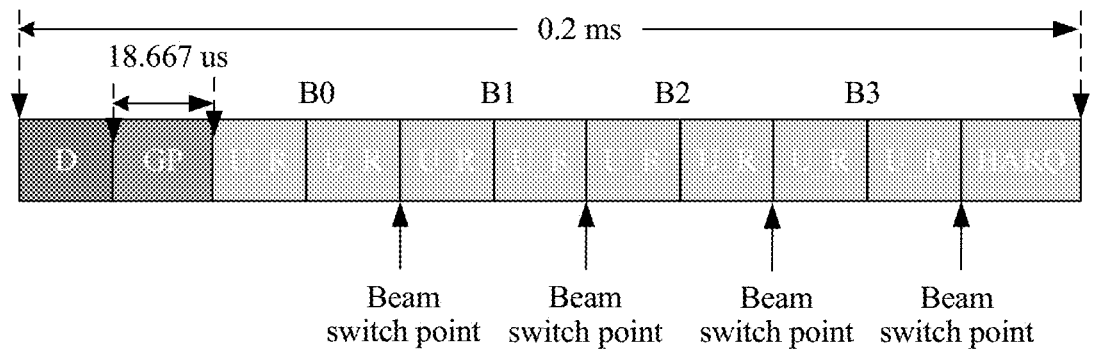
FIG. 10 is a schematic structural diagram of a frame of a response signal according to an embodiment.

For example, as shown in FIG. 10, FIG. 10 provides a specific subframe structure of a response signal. One subframe supports sending of response signals of four beams, and a response signal of each beam occupies two symbols. A beam switch point exists between response signals of each two beams. In the frame structure, each two adjacent beam switch points define one beam time domain. A beam herein is a receive beam of the base station. When a time resource for a response feedback is solidified in a system, the base station may schedule a corresponding beam on a corresponding time resource for receiving. When a time resource for a response feedback is determined by the UE according to an outer-loop beam signal delivered by the base station, the base station may obtain a time resource of a corresponding response signal according to a same rule, and schedule a corresponding receive beam on the obtained time resource. For example, on a time resource on which a response signal of an outer-loop beam B0 is located, a corresponding receive beam B0 is scheduled. It should be noted that a receive beam and an outer-loop beam may be consistent, or may be inconsistent, and may be specifically designed according to a system requirement.

In terms of code resource, a sequence of a response signal corresponding to each beam may use a fixed sequence, and this is different from a case in which a sequence of a random access signal RACH is randomly selected from 64 sequences.

Optionally, a sequence length of a response signal is 139 (including 139 elements), and may be circularly extended to 144 (by duplicating first five elements to the end of the sequence). The length of 144 is the same as that of a short RACH. A sequence generation formula may be as follows:

$$x_u(n) = e^{-j\frac{\pi u n(n+1)}{N_{ZC}}}, 0 \le n \le N_{ZC} - 1,$$

where n is a sequence element index, and U is a root sequence index.

Optionally, a sequence length of a response signal may be the same as a length of a long RACH.

Optionally, UE in an idle mode and UE in a connected mode may feed back different response signals.

Specifically, response signals may use different resources. An example is as follows.

Code resources (sequence resources) used by uplink response signals fed back in B0-BN corresponding to the UE in an idle mode are S1-SN, and code resources (sequence resources) used by uplink response signals fed back in B0-BN corresponding to the UE in a connection mode are Q1-QN.

In this case, if the base station receives Si, the base station may learn that there is user equipment that needs to be served in a beam corresponding to Bi, and the user equipment is UE in an idle mode. If the base station receives Qi, the base station may learn that there is user equipment that needs to be served in a beam corresponding Bi, and the user equipment is UE in a connected mode.

Optionally, for different UE types, the base station may perform different inner-loop beam processing.

For example, if the base station receives a response signal fed back by the UE in a connected mode, a period of sending an inner-loop beam signal in an inner-loop beam corresponding to the response signal may be longer because the UE in a connected mode has obtained a system message, and the system message usually does not change in a relatively long period of time.

If the base station receives a response signal fed back by the UE in an idle mode, a period of sending an inner-loop beam signal in an inner-loop beam corresponding to the response signal may be shorter because the UE in an idle mode does not obtain a system message, and may access a network at any time.

It should be noted that in a same beam, when the UE in an idle mode is not differentiated from the UE in a connected mode, time resources used by uplink response signals sent by different UEs may be the same, or may be different.

When the time resources are the same, the base station may perform subsequent inner-loop beam scanning according to response signals fed back by multiple UEs that receive a same beam.

An optional implementation of determining whether the UE is in an idle mode or a connected mode is as follows: If the base station finds a same beam, and there is no UE in an idle mode, a period of sending an inner-loop beam signal of an inner-loop beam corresponding to the beam may use a relatively large value. Optionally, if the base station finds a same beam, and there is UE in an idle mode, a period of sending an inner-loop beam signal of an inner-loop beam corresponding to the beam may be relatively short according to a particular rule. The rule may indicate that when there is only one UE in an idle mode, the period is relatively short, or when a proportion of UE in an idle mode is greater than a threshold, the period is relatively short. This is not limited herein.

(3) A Specific Manner of Achieving an Objective

An objective of a response feedback lies in enabling the base station to learn beams in which inner-loop beam scanning should be performed. Specifically, the UE may notify the base station of information about an outer-loop beam in which an outer-loop beam signal received by the UE is located, or the UE notifies, according to a correspondence between an outer-loop beam and an inner-loop beam, the base station of information about an inner-loop beam that is corresponding to an outer-loop beam in which an outer-loop beam signal received by the UE is located.

Optionally, it can be learned from the resource part in the foregoing (2) that a resource used by a response is corresponding to an outer-loop beam corresponding to the response. Therefore, the base station may learn, according to the resource used by the response, an outer-loop beam for which a feedback is performed, so as to learn information about a corresponding inner-loop beam.

Optionally, the information about the corresponding inner-loop beam may be learned by explicitly carrying an outer-loop beam identifier signal in a response signal such as an outer-loop beam ID, or by explicitly carrying an inner-loop beam identifier signal such as an inner-loop beam ID.

Resource of an Inner-Loop Beam Signal

A resource of an inner-loop beam signal may also include at least one of a space resource, a time resource, a frequency resource, or a code resource.

Resource Design

In terms of space resource, as mentioned in S103, the base station sends an inner-loop beam signal according to a response of the UE. For outer-loop beam scanning with full coverage for one time, only several outer-loop beams (for example, a set 1 including B0, B3, and B4) in all outer-loop beams may be corresponding to the response of the UE, and for outer-loop beam scanning with full coverage for another time, only several other outer-loop beams (for example, a set 2 including B0, B2, and B6) in all the outer-loop beams may be corresponding to the response of the UE. Therefore, for outer-loop beam scanning with full coverage for different times, sets of outer-loop beams corresponding to responses received by the base station may also be different. Because an inner-loop beam is corresponding to an outer-loop beam, for inner-loop beam scanning for different times, space resource sets of inner-loop beam signals sent by the base station may also be different, that is, may be changeable. The outer-loop beam scanning with full coverage for one time is corresponding to a period T, that is, space resource sets corresponding to inner-loop beam signals sent in different outer-loop beam scanning periods T are changeable.

In terms of time resource (that is, a location in a frame structure), a period of sending an inner-loop beam signal is T2. Compared with the period T1 of sending an outer-loop beam signal, T2 is less than or equal to T1.

Figure 11:
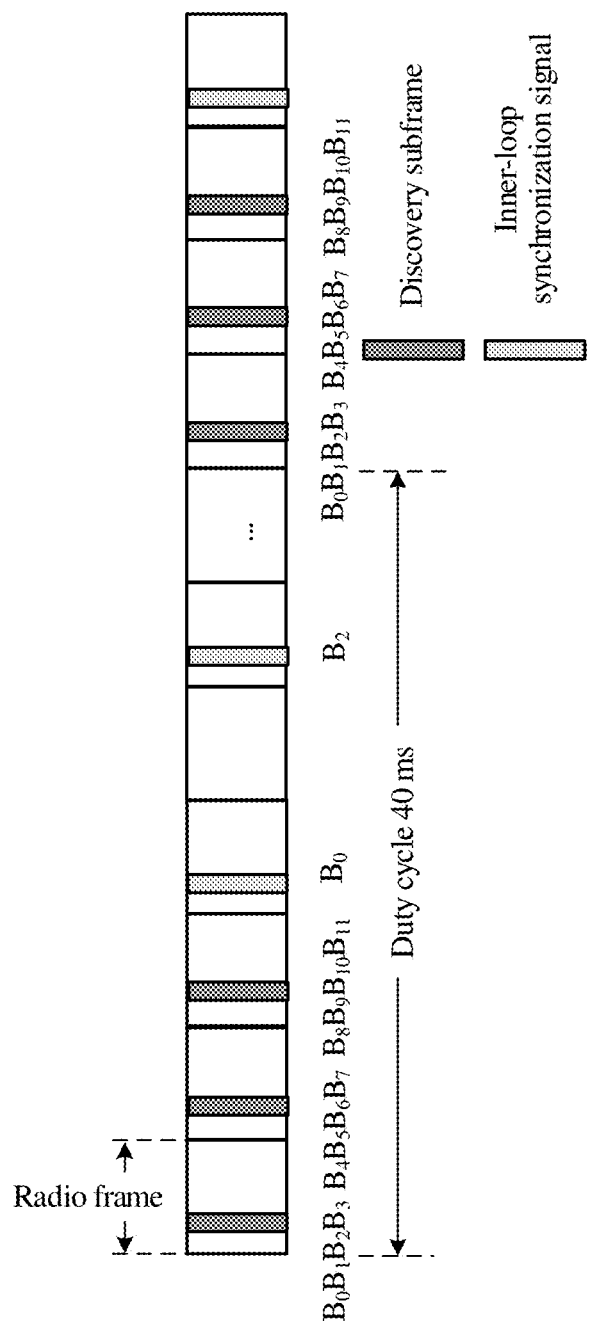
FIG. 11 is a schematic diagram of a time order of an outer-loop beam signal and an inner-loop beam signal according to an embodiment.
Figure 12:
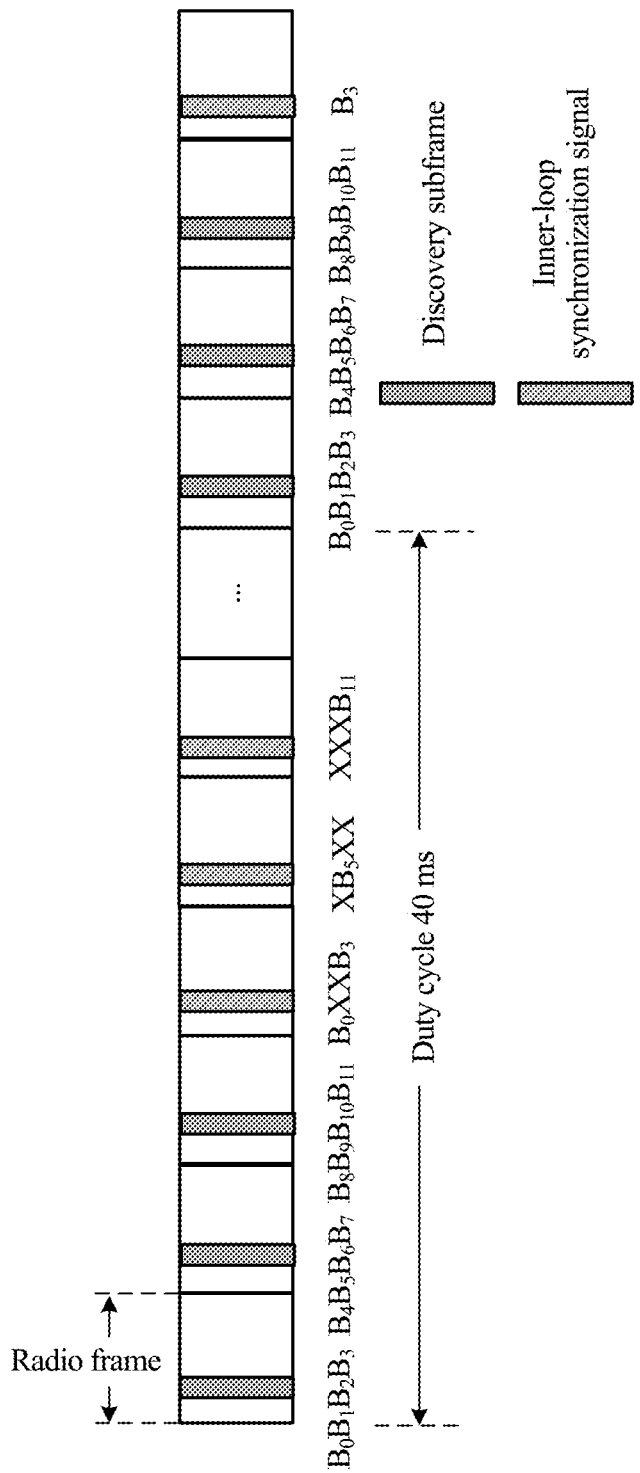
FIG. 12 is a schematic diagram of a time order of an outer-loop beam signal and an inner-loop beam signal according to an embodiment.
Figure 13:
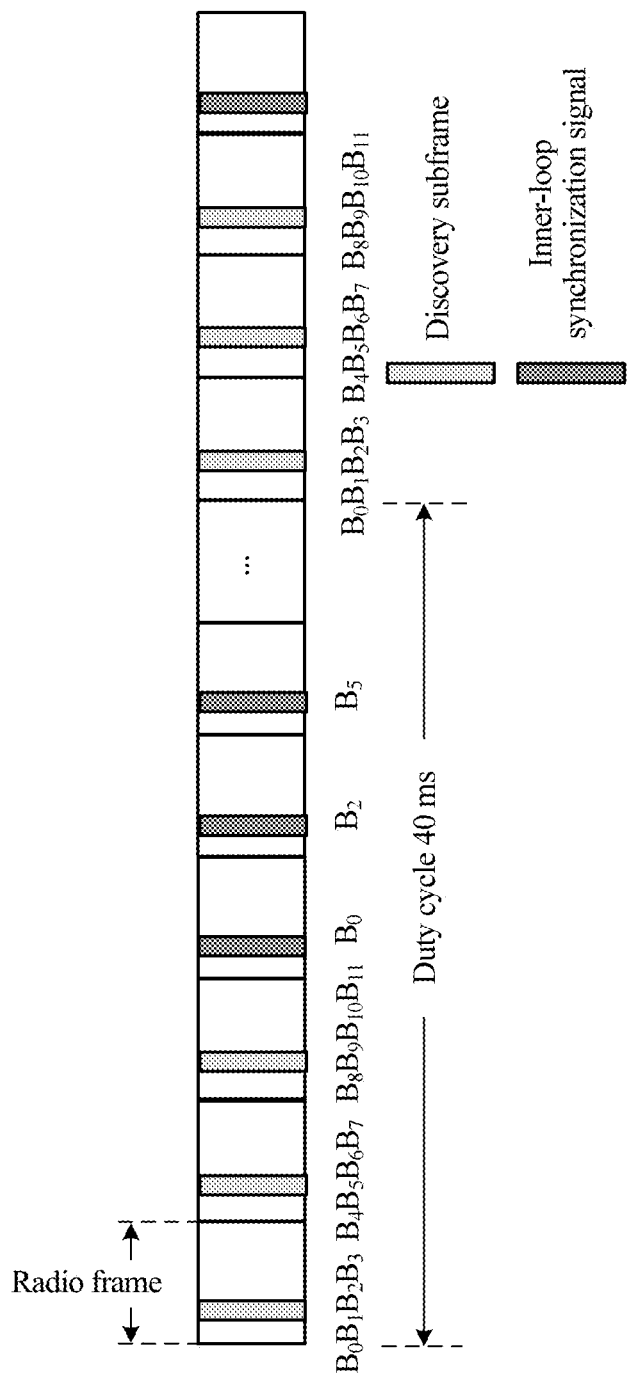
FIG. 13 is a schematic diagram of a time order of an outer-loop beam signal and an inner-loop beam signal according to an embodiment.

An inner-loop beam signal is sent in some inner-loop beams, and is not sent in some other inner-loop beams. Therefore, there may be two manners in terms of time resource design. A first manner is that a resource is reserved on a time resource for an inner-loop beam signal of each inner-loop beam. When an inner-loop beam signal of a corresponding inner-loop beam is to be sent, the inner-loop beam signal is sent on the reserved time resource. When no inner-loop beam signal of a corresponding inner-loop beam is to be sent, the reserved time resource may be used to perform data transmission (whether the data transmission is uplink transmission or downlink transmission is not limited), but the reserved time resource is not used to send an inner-loop beam signal of another inner-loop beam. That is, a location of a time resource used for sending an inner-loop beam signal corresponding to each inner-loop beam is fixed in a frame structure with a radio frame cycle (for example, 0-1023 radio frames in an LTE system). For example, as shown in FIG. 11, FIG. 12, and FIG. 13, at least two contiguous radio frames are allocated to send an inner-loop beam signal, and each radio frame is allocated to one or more inner-loop beams. In FIG. 11, each radio frame is allocated to an inner-loop beam. When inner-loop beam signals are to be sent in inner-loop beams B0 and B2, the inner-loop beam signals corresponding to B0 and B2 are sent on a resource reserved in a radio frame corresponding to B0 and B2. When no inner-loop beam signal is to be sent in an inner-loop beam B1, no inner-loop beam signal is sent on a resource reserved in a radio frame corresponding to B1. In FIG. 12, each radio frame is allocated to four inner-loop beams. When corresponding inner-loop beam signals are to be sent in inner-loop beams B0, B3, B5, and B11, the inner-loop beam signals corresponding to B0, B3, B5, and B11 are sent on a resource reserved in a radio frame corresponding to B0, B3, B5, and B11. A second manner is a resource is reserved on a time resource for sending an inner-loop beam signal. For example, several symbols of a subframe in a radio frame are fixed to transmit an inner-loop beam signal, but the reserved resource is not bound with an inner-loop beam signal corresponding to a particular inner-loop beam. That is, a time resource (that is, a location in a frame structure) used for sending an inner-loop beam signal corresponding to each inner-loop beam is changeable. For example, as shown in FIG. 13, at least two contiguous radio frames are allocated to send an inner-loop beam signal. When inner-loop beam signals are to be sent in inner-loop beams B0, B2, and B5, the inner-loop beam signals corresponding to B0, B2, and B5 are successively sent on corresponding resources in contiguous radio frames. This is different from the first manner, and a resource that is bound with B1 is reserved for an inner-loop beam signal corresponding to B1.

Optionally, in a radio frame, a relative location of a subframe in which an inner-loop beam signal is sent may be the same as or may be different from a relative location of a subframe in which an outer-loop beam signal is sent.

For example, FIG. 11, FIG. 12, and FIG. 13 show a same case. In FIG. 12, an outer-loop beam is in a one-to-one correspondence with an inner-loop beam. When outer-loop beam signals of four beams are sent in a radio frame, inner-loop beam signals of four beams are also sent in a corresponding location of a radio frame. In FIG. 11 and FIG. 13, when outer-loop beam signals of four outer-loop beams (which may be referred to as four outer-loop beam signals for short) are sent in a radio frame, an inner-loop beam signal of one inner-loop beam (which may be referred to as one inner-loop beam signal for short) is sent in the radio frame. In a radio frame, a relative location of a subframe in which the inner-loop beam signal of the inner-loop beam is located is the same as a relative location of a subframe in which an outer-loop beam signal of an outer-loop beam corresponding to the inner-loop beam is located.

Still further, optionally, when a signal in an outer-loop beam signal and a signal in an inner-loop beam signal have a same function type, in a subframe, relative locations of symbols occupied by the signal in the outer-loop beam signal and by the signal in the inner-loop beam signal may be different, or may be the same.

Figure 14:
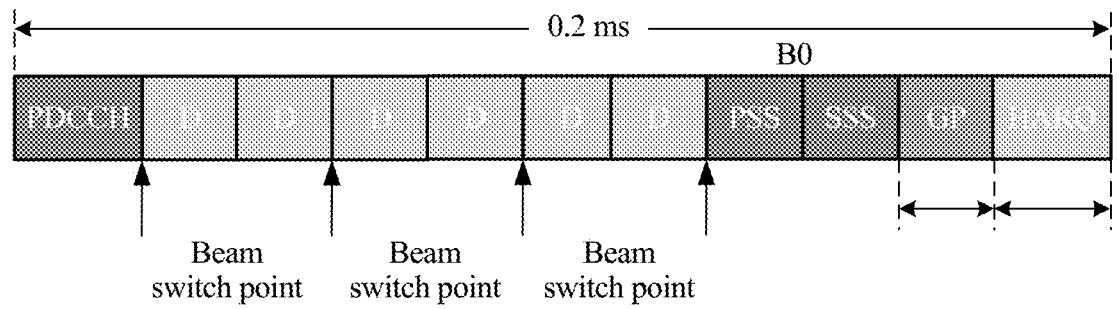
FIG. 14 is a schematic structural diagram of a subframe of an inner-loop beam signal according to an embodiment.
Figure 15:
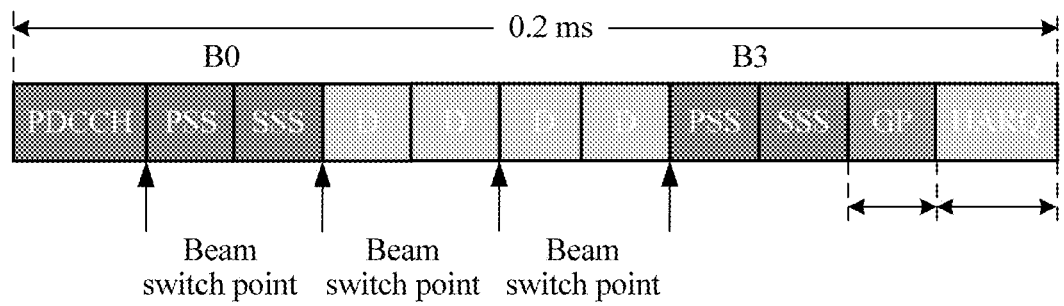
FIG. 15 is a schematic structural diagram of a subframe of an inner-loop beam signal according to an embodiment.

For example, FIG. 14 shows a different case. Both an outer-loop beam signal and an inner-loop beam signal include a synchronization signal, and the synchronization signal includes a PSS and an SSS. In 11 symbols of a subframe, a synchronization signal of an inner-loop beam B0 occupies the seventh symbol and the eighth symbol, however, as shown in FIG. 8b, a synchronization signal of an outer-loop beam B0 occupies the first symbol and the second symbol. FIG. 15 shows a same case. In FIG. 15, an outer-loop beam is in a one-to-one correspondence with an inner-loop beam. Both an outer-loop beam signal and an inner-loop beam signal include a synchronization signal, and the synchronization signal includes a PSS and an SSS. A subframe structure of a synchronization signal of the outer-loop beam is consistent with a subframe structure of a synchronization signal of the inner-loop beam. A synchronization signal of an inner-loop beam B0 occupies the first symbol and the second symbol, and a synchronization signal of an outer-loop beam B0 also occupies the first symbol and the second symbol. A synchronization signal of an inner-loop beam B3 occupies the seventh symbol and the eighth symbol, and a synchronization signal of an outer-loop beam B3 also occupies the seventh symbol and the eighth symbol. When a corresponding synchronization signal is to be sent in an inner-loop beam, the corresponding synchronization signal is sent on a time resource corresponding to the inner-loop beam. When no corresponding synchronization signal is to be sent in an inner-loop beam, a time resource corresponding to the inner-loop beam may be used to transmit data. In FIG. 15, synchronization signals are sent in inner-loop beams B0 and B3, and no synchronization signal is sent in inner-loop beams B1 and B2, and time resources corresponding to the inner-loop beams B1 and B2 are used to transmit data.

Because an inner-loop beam signal of an inner-loop beam is sent based on a response of the UE to an outer-loop beam corresponding to the inner-loop beam, in a time order, the inner-loop beam signal of the inner-loop beam is sent after the outer-loop beam corresponding to the inner-loop beam is responded. In addition, because multiple implementations exist between a feedback time order of the foregoing response and a time order of an outer-loop beam signal corresponding to the inner-loop beam signal, multiple implementations also exist in time orders of the inner-loop beam signal and the outer-loop beam signal corresponding to the inner-loop beam signal. For example, in an outer-loop beam signal period T, an inner-loop beam signal starts to be sent after outer-loop beam signals of all outer-loop beams are sent, or an inner-loop beam signal is sent after an outer-loop beam signal corresponding to the inner-loop beam signal is sent and before another outer-loop beam signal is sent. A specific design may be performed according to a practical requirement, and details are not described herein.

Resource Obtaining Manner

A resource (for example, at least one of a time resource, a frequency resource, or a code resource) of an inner-loop beam signal may be solidified during a system design, or may be carried in each outer-loop beam signal. For example, the resource is directly carried in a broadcast signal included in each outer-loop beam signal, or is obtained by the UE by means of calculation according to a received outer-loop beam signal, for example, by means of calculation according to a resource of the received outer-loop beam signal or a resource of a signal in the received outer-loop beam signal.

To perform data matching when the UE transmits data, resources of inner-loop beam signals of all sent inner-loop beams may be sent by using a broadcast signal in an inner-loop beam signal or a broadcast signal in an outer-loop beam signal.

For example, if all the sent inner-loop beams are B0, B2, and B5, at least one of time resources, frequency resources, or code resources used by inner-loop beam signals of B0, B2, and B5 are sent by using a broadcast signal in an inner-loop beam signal. For example, corresponding outer-loop beam signals are sent in outer-loop beams B0-B3, response signals are received for outer-loop beams B0 and B2, and according to the response signals, it is determined that inner-loop beam signals are sent in inner-loop beams B1 and B2. In this case, resources used by the inner-loop beam signals of the inner-loop beams B1 and B2 are sent by using a broadcast signal in an outer-loop beam signal of at least one of an outer-loop beam B4 or a subsequent outer-loop beam. The resources are at least one of time resources, frequency resources, or code resources. Preferably, the resources are sent in outer-loop beam signals corresponding to all outer-loop beams except the outer-loop beams B0-B3.

Sending of a random access signal

In S104, a first wireless network device receives a random access signal sent by a second wireless network device according to a second signal set.

Optionally, a random access signal and a response signal that are related to a same second signal set use different code resources.

In this way, the first wireless network device may determine, according to different code resources, whether a random access signal or a response signal is received.

Optionally, relative locations of symbols occupied in a subframe by a random access signal and a response signal that are related to a same second signal set are the same.

Optionally, when a random access signal and the response signal are related to a same second signal set, the random access signal and the response signal use a same frequency resource.

Optionally, when a random access signal and a response signal are related to a same second signal set, duration of the random access signal is longer than or equal to duration of the response signal.

For second signal sets with different beam IDs, each second signal set is corresponding to a random access signal.

Random Access Process

In an existing LTE-Release-8/9/10 system, a conventional physical random access channel (PRACH) sending process is used, and is classified into a non-contention based random access process and a contention-based random access process. The contention-based random access process includes four steps. Step 1: UE randomly selects a PRACH sequence (preamble), and sends the PRACH sequence to an eNB. Step 2: The eNB sends a random access response (RAR) signal to the UE after receiving the PRACH preamble sent by the UE. Step 3: The UE sends a layer-2 (L2) message and/or a layer-3 (L3) message to the eNB. Step 4: The eNB selects, according to a power of receiving a PRACH of the UE, UE with a maximum transmit power as UE that successfully contends for the PRACH sequence, and the eNB sends a contention success message to the UE, and instructs the UE to select the preamble 1 to access the eNB. Usually, step 1 to step 4 are referred to as a message 1, a message 2, a message 3, and a message 4.

In this embodiment of the present invention, a random access signal is associated with a beam, and random access signals of all beams may use different resources. The different resources may include different random access preamble groups. The different random access preamble groups may include at least one of different sequences, different sequence quantities, or different time-frequency resources.

A resource used by a random access signal of each beam may be explicitly delivered by using a second signal set of the beam, or may be implicitly bound with at least one signal in a second signal set of the beam.

For example, an explicit delivering manner is as follows.

If a broadcast signal or a system message in an $n^{th}$ second signal set notifies the UE that a sequence group for random access is a preamble group n, included sequences are (Pn1, Pn2, Png, . . . and PnG), and a time-frequency resource for sending a random access preamble (preamble) is (tn, fn), where t is a time resource, and f is a frequency resource, and if a broadcast channel or a system message in an $m^{th}$ second signal set notifies the UE that a sequence group for random access is a preamble group m, included sequences are (Pm1, Pm2, Pmg, . . . PmG), and a time-frequency resource for sending a random access preamble is (tm, fm), where t is a time resource, and f is a frequency resource.

For example, an implicit binding manner is as follows.

Information for sending a preamble by the UE is not notified by using a second signal set, (tn, fn) and (Pn1, Pn2, Png, . . . PnG) of an $n^{th}$ beam are bound with a resource of at least one second signal in the second signal set, and (tm, fm) and (Pm1, Pm2, Pmg, . . . PmG) of an $m^{th}$ beam are bound with at least one of a time resource, a frequency resource, or a code resource of a synchronization signal in an $m^{th}$ second signal set.

Alternatively, a resource for sending a preamble by the UE is in a particular correspondence with a second beam ID of a second signal set.

Optionally, if the UE simultaneously detects multiple second signal sets, the UE may randomly use a resource of a random access signal determined according to the multiple second signal sets, or the UE may select one of the multiple second signal sets, and randomly use a resource of a random access signal determined according to the second signal set. The resource of the random access signal in the multiple second signal sets is used, thereby reducing collision of random access signals of the UE.

For example, if the UE simultaneously detects the $m^{th}$ second signal set and the $n^{th}$ second signal set, the UE may randomly select a resource from (tn, fn) and (Pn1, Pn2, Png, . . . PnG) that are determined by using the $n^{th}$ second signal set and (tm, fm) and (Pm1, Pm2, Pmg, . . . PmG) that are determined by using the $m^{th}$ second signal set, so as to send a random access signal. Alternatively, if the UE simultaneously detects the $m^{th}$ second signal set and the $n^{th}$ second signal set, the UE selects one second signal set from the two signal sets. For example, the UE selects the $m^{th}$ second signal set with better signal quality, and then selects a resource from (tm, fm) and (Pm1, Pm2, Pmg, . . . PmG) that are determined by using the $m^{th}$ second signal set, so as to send a random access signal.

Optionally, a resource for receiving an RAR by the UE may be corresponding to each second signal set. A specific corresponding manner may be an explicit corresponding manner or an implicit corresponding manner. For the corresponding manner, refer to a manner in which the UE sends a resource of a random access signal. Details are not described herein.

An embodiment of the present invention further provides a wireless access method. The method is described from a perspective of a second wireless network device, and includes receiving N first signal sets sent by a first wireless network device on N first resources, where N is an integer greater than 1, feeding back, to the first wireless network device, I response signals for H received first signal sets, where each response signal includes indication information of a resource on which the first signal set is located, both H and I are integers greater than or equal to 1, H is less than or equal to N, and I is less than or equal to H, and receiving J second signal sets sent by the first wireless network device on J second resources according to the I response signals, where J is an integer greater than or equal to 1.

It should be noted that H is equal to or less than N, and I is less than or equal to Z.

The method is described from the perspective of the single second wireless network device, however, in a communications network, the first wireless network device may cover one or more second wireless network devices. The first wireless network device sends both a first signal set and a second signal set for the one or more second wireless network devices.

Optionally, the first signal set at least includes a synchronization signal, and the second signal at least set includes a system message.

Optionally, a set of the first signal set and the second signal set includes all configuration signals required when the second wireless network device and the first wireless network device establish a wireless connection.

Optionally, a data size of the first signal set is less than a data size of the second signal set.

Optionally, the method may further include sending a random access signal according to the J received second signal sets.

A resource used by the random access signal is associated with the J received second signal sets.

That a resource used by the random access signal is associated with the J received second signal sets may specifically include the resource used by the random access signal is a resource selected from resources of random access signals that are determined according to the J received second signal sets, or the resource used by the random access signal is a resource selected from resources of a random access signal determined according to a second signal set that is selected from the J received second signal sets.

Optionally, the method may further include receiving a random access answer signal sent by the first wireless network device.

The random access answer signal is received on a resource that is of the random access answer signal and that is determined according to the second signal set.

For a concept, explanation, detailed description, and other steps that are involved in the method and related to the technical solution provided in this embodiment of the present invention, refer to description about the content in the foregoing method or in another embodiment. Details are not described herein again.

An embodiment of the present invention further provides another wireless access method. The method is described from a perspective of a second wireless network device, and includes the following steps.

S201. Determine that a received first signal belongs to a first signal set, where the first signal set carries space resource information of the received signal.

S203. Feed back a response signal to a first wireless network device according to the first signal.

Further, the method includes the following step.

S205. Determine that a received second signal belongs to a second signal set, and send a random access signal according to the second signal.

Optionally, the sending a random access signal according to the second signal includes determining a resource of the random access signal according to a resource used by the second signal or according to a resource that is carried in the second signal and that is of a random access signal corresponding to the second signal set.

Further, the method includes the following step.

S207. Receive, according to the second signal, a random access answer signal sent by the first wireless network device.

In S201, the second wireless network device receives a signal by means of blind detection. For a specific method for determining that the received signal is a first signal in the first signal set, refer to description of another embodiment of the present invention.

In S203, for a resource, a condition, and a manner for feeding back the response signal by the second wireless network device, and the like, refer to description of another embodiment of the present invention.

In S205, the second wireless network device may receive a signal by means of blind detection, or may determine a received resource according to the first signal. For a method for determining a second signal by the second wireless network device, a resource and a manner for sending a random access signal, and the like, refer to description of another embodiment of the present invention.

In S207, the second wireless network device may receive a signal according to the second signal, so as to determine a received resource. For a manner of determining the received resource determined by the second wireless network device, and the like, refer to description of another embodiment of the present invention.

It should be noted that for a concept, explanation, detailed description, and other steps that are involved in the method and related to the technical solution provided in this embodiment of the present invention, refer to description about the content in the foregoing method or in another embodiment. Details are not described herein again.

Figure 16:
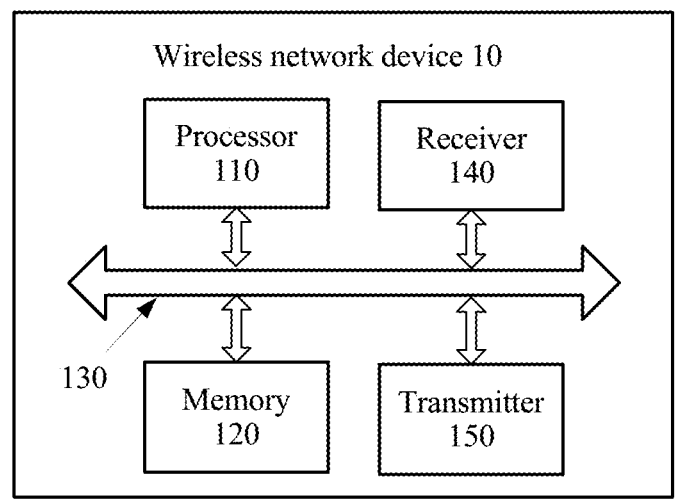
FIG. 16 is a schematic structural diagram of a wireless network device according to an embodiment.

According to the method provided in the embodiment of the present invention, as shown in FIG. 16, an embodiment of the present invention further provides a wireless access apparatus. The apparatus may be a wireless network device 10, and the wireless network device 10 is corresponding to the first wireless network device in the foregoing wireless access method. The first wireless network device may be a base station, or may be another device. This is not limited herein.

The wireless network device includes a processor 110, a memory 120, a bus system 130, a receiver 140, and a transmitter 150. The processor 110, the memory 120, the receiver 140, and the transmitter 150 are connected to each other by using the bus system 130. The memory 120 is configured to store an instruction. The processor 110 is configured to execute the instruction stored by the memory 120, so as to control the receiver 140 to receive a signal and control the transmitter 150 to send a signal, and complete steps in the foregoing wireless access method. The receiver 140 and the transmitter 150 may be a same physical entity or different physical entities. When the receiver 140 and the transmitter 150 are a same physical entity, the receiver 140 and the transmitter 150 may be collectively referred to as a transceiver.

The steps at least may include sending N first signal sets on N first resources, where N is an integer greater than 1, receiving Z response signals fed back by a second wireless network device for the N first signal sets, where each response signal includes indication information of a resource on which the first signal set is located, Z is an integer greater than or equal to 1, and Z is less than or equal to N, and sending M second signal sets on M second resources according to the Z response signals, where M is an integer greater than or equal to 1.

In an implementation, it may be considered that functions of the receiver 140 and the transmitter 150 are implemented by using a transceiver circuit or a dedicated transceiver chip. It may be considered that the processor 110 is implemented by using a dedicated processing chip, a processing circuit, a processor, or a general purpose chip.

In another implementation, it may be considered that the wireless access device provided in this embodiment of the present invention is implemented by using a general purpose computer. That is, program code for implementing functions of the processor 110, the receiver 140, and the transmitter 150 are stored in the memory, and the general purpose processor implements the functions of the processor 110, the receiver 140, and the transmitter 150 by executing the code in the memory.

For a concept, explanation, detailed description, and other steps that are involved in the wireless network device and related to the technical solution provided in this embodiment of the present invention, refer to description about the content in the foregoing method or in another embodiment. Details are not described herein again.

Figure 17:
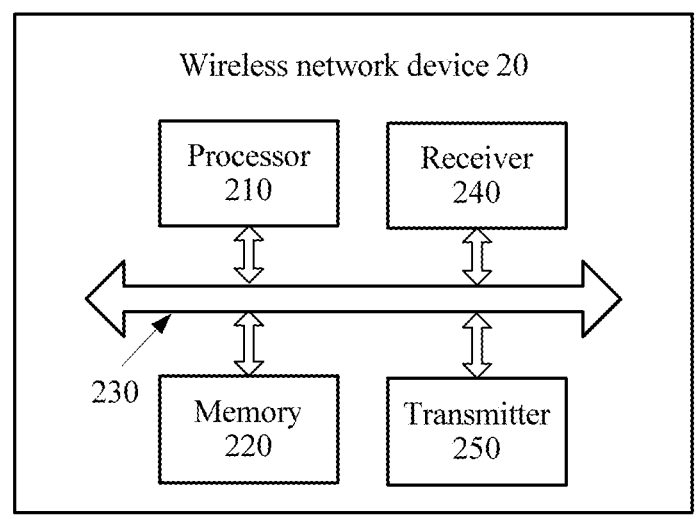
FIG. 17 is a schematic structural diagram of a wireless network device according to an embodiment.

According to the method provided in the embodiment of the present invention, as shown in FIG. 17, an embodiment of the present invention further provides another wireless access apparatus. The apparatus may be a wireless network device 20, and the wireless network device 20 is corresponding to the second wireless network device in the foregoing wireless access method. The second wireless network device may be UE, or may be a micro base station or a small cell. This is not limited herein.

The wireless network device includes a processor 210, a memory 220, a bus system 230, a receiver 240, and a transmitter 250. The processor 210, the memory 220, the receiver 240, and the transmitter 250 are connected to each other by using the bus system 230. The memory 220 is configured to store an instruction. The processor 210 is configured to execute the instruction stored by the memory 220, so as to control the receiver 240 to receive a signal and control the transmitter 250 to send a signal, and complete steps in the foregoing wireless access method. The receiver 240 and the transmitter 250 may be a same physical entity or different physical entities. When the receiver 240 and the transmitter 250 are a same physical entity, the receiver 240 and the transmitter 250 may be collectively referred to as a transceiver.

The steps at least may include receiving N first signal sets sent by a first wireless network device on N first resources, where N is an integer greater than 1, feeding back, to the first wireless network device, I response signals for H received first signal sets, where each response signal includes indication information of a resource on which the first signal set is located, both H and I are integers greater than or equal to 1, H is less than or equal to N, and I is less than or equal to H, receiving J second signal sets sent by the first wireless network device on J second resources according to the I response signals, where J is an integer greater than or equal to 1, or determining that a received signal is a first signal in the first signal set, where the first signal in the first signal set carries space resource information of the received signal, and feeding back a response signal to the first wireless network device according to the first signal.

In an implementation, it may be considered that functions of the receiver 240 and the transmitter 250 are implemented by using a transceiver circuit or a dedicated transceiver chip. It may be considered that the processor 210 is implemented by using a dedicated processing chip, a processing circuit, a processor, or a general purpose chip.

In another implementation, it may be considered that the wireless access device provided in this embodiment of the present invention is implemented by using a general purpose computer. That is, program code for implementing functions of the processor 210, the receiver 240, and the transmitter 250 are stored in the memory, and the general purpose processor implements the functions of the processor 210, the receiver 240, and the transmitter 250 by executing the code in the memory.

For a concept, explanation, detailed description, and other steps that are involved in the second wireless network device and related to the technical solution provided in this embodiment of the present invention, refer to description about the content in the foregoing method or in another embodiment. Details are not described herein again.

According to the method provided in this embodiment of the present invention, an embodiment of the present invention further provides a communications system, including the foregoing first wireless network device and one or more second wireless network devices.

It should be understood that in the embodiments of the present invention, the processor 110 or 210 may be a central processing unit (Central Processing Unit, "CPU" for short), or the processor may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor may be any conventional processor, or the like.

The memory 120 or 220 may include a read-only memory and a random access memory, and provides an instruction and data for the processor 310. A part of the memory may further include a nonvolatile random access memory. For example, the memory may further store information about a device type.

In addition to a data bus, the bus system 130 or 230 may include a power bus, a control bus, a status signal bus, and the like. However, for clarity of description, various buses are marked as the bus system in the figure.

In an implementation process, steps of the foregoing methods may be completed by using an integrated logic circuit of hardware in the processor 110 or 210 or an instruction in a form of software. The steps of the methods disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory, and completes the steps of the foregoing methods in combination with hardware of the processor. To avoid repetition, details are not described herein again.

It should further be understood that "first", "second", "third", "fourth", and various numbers are merely used for differentiation for ease of description, and are not construed as a limitation on the scope of embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that order numbers of the foregoing processes do not mean execution orders in various embodiments of the present invention. The execution orders of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims

What is claimed is:

1. A method, comprising:
sending a first signal set to a terminal device, a number of the first signal set being one or more than one, and the first signal set comprising a synchronization signal;
receiving a request signal from the terminal device, the request signal requesting a second signal which carries at least one of cell reselection information, a neighboring cell list, notification information of an earthquake and tsunami warning (ETWS), or notification of a common alert (CMAS), wherein a sequence length for the request signal is the same as a sequence length for a random access signal, and the request signal is associated with the first signal set; and
sending the second signal to the terminal device.

2. The method according to claim 1, wherein the first signal set further comprises a broadcast signal.

3. The method according to claim 1, wherein a resource carrying the request signal is associated with the first signal set.

4. The method according to claim 3, wherein the resource carrying the request signal being associated with the first signal set includes at least one of:
a time resource carrying the request signal being associated with at least one of a time resource, a frequency resource, or a code resource of the first signal set;
a frequency resource carrying the request signal being associated with at least one of a time resource, a frequency resource, or a code resource of the first signal set; or
a space resource carrying the request signal being associated with at least one of a time resource, a frequency resource, or a code resource of the first signal set.

5. The method according to claim 1, wherein a reference signal received power (RSRP) of the synchronization signal in the first signal set exceeds a preset threshold.

6. The method according to claim 1, wherein the sequence length of the request signal is 139.

7. The method according to claim 1, wherein a sequence $x_u(n)$ for the request signal satisfies $$x_u(n) = e^{-j\frac{\pi u n(n+1)}{N_{ZC}}}, 0 \le n \le N_{ZC} - 1,$$

and wherein n is a sequence element index, u is a root sequence index, $N_{ZC}$ is a length of the sequence.

8. The method according to claim 1, further comprising receiving the random access signal from the terminal device.

9. The method according to claim 1, wherein a code resource for the request signal is different from a code resource for the random access signal.

10. An apparatus, comprising:
one or more processors;
a memory coupled to the one or more processors, wherein the memory stores a program to be executed by the one or more processors, the program including instructions for:
sending a first signal set to a terminal device, a number of the first signal set being one or more than one, and the first signal set comprising a synchronization signal;
receiving a request signal from the terminal device, the request signal requesting a second signal which carries at least one of cell reselection information, a neighboring cell list, notification information of an earthquake and tsunami warning (ETWS), or notification information of a common alert (CMAS), wherein a sequence length for the request signal is the same as a sequence length for a random access signal, and the request signal is associated with the first signal set; and
sending the second signal to the terminal device.

11. The apparatus according to claim 10, wherein the first signal set further comprises a broadcast signal.

12. The apparatus according to claim 10, wherein a resource carrying the request signal is associated with the first signal set.

13. The apparatus according to claim 12, wherein the resource carrying the request signal being associated with the first signal set includes at least one of:
a time resource carrying the request signal being associated with at least one of a time resource, a frequency resource, or a code resource of the first signal set;
a frequency resource carrying the request signal being associated with at least one of a time resource, a frequency resource, or a code resource of the first signal set; or
a space resource carrying the request signal being associated with at least one of a time resource, a frequency resource, or a code resource of the first signal set.

14. The apparatus according to claim 10, wherein a reference signal received power (RSRP) of the synchronization signal in the first signal set exceeds a preset threshold.

15. The apparatus according to claim 10, wherein the sequence length of the request signal is 139.

16. The apparatus according to claim 10, wherein a sequence $x_u(n)$ for the request signal satisfies $$x_u(n) = e^{-j\frac{\pi u n(n+1)}{N_{ZC}}}, 0 \le n \le N_{ZC} - 1,$$

and wherein n is a sequence element index, u is a root sequence index, $N_{ZC}$ is a length of the sequence.

17. The apparatus according to claim 10, wherein the program further includes instructions for: receiving the random access signal from the terminal device.

18. The apparatus according to claim 10, wherein a code resource for the request signal is different from a code resource for the random access signal.

19. A non-transitory computer readable medium, wherein the non-transitory computer readable medium stores instructions that are executable by a computer, and wherein the instructions comprise instructions for:
sending a first signal set to a terminal device, a number of the first signal set being one or more than one, and the first signal set comprising a synchronization signal;
receiving a request signal from the terminal device, the request signal requesting a second signal which carries at least one of cell reselection information, a neighboring cell list, notification information of an earthquake and tsunami warning (ETWS), or notification information of a common alert (CMAS), wherein a sequence length for the request signal is the same as a sequence length for a random access signal, and the request signal is associated with the first signal set; and sending the second signal to the terminal device.

20. The non-transitory computer readable medium according to claim 19, wherein the first signal set further comprises a broadcast signal.

21. The non-transitory computer readable medium according to claim 19, wherein a resource carrying the request signal is associated with the first signal set.

22. The non-transitory computer readable medium according to claim 21, wherein the resource carrying the request signal being associated with the first signal set includes at least one of the following:
- a time resource carrying the request signal being associated with at least one of a time resource, a frequency resource, or a code resource of the first signal set;
- a frequency resource carrying the request signal being associated with at least one of a time resource, a frequency resource, or a code resource of the first signal set; or
- a space resource carrying the request signal being associated with at least one of a time resource, a frequency resource, or a code resource of the first signal set.

23. The non-transitory computer readable medium according to claim 19, wherein a reference signal received power (RSRP) of the synchronization signal in the first signal set exceeds a preset threshold.

24. The non-transitory computer readable medium according to claim 19, wherein the sequence length of the request signal is 139.

25. The non-transitory computer readable medium according to claim 19, wherein a sequence $x_u(n)$ for the request signal satisfies:

$$x_u(n) = e^{-j\frac{\pi u n(n+1)}{N_{ZC}}}, 0 \leq n \leq N_{ZC} - 1,$$

and wherein n is a sequence element index, u is a root sequence index, $N_{ZC}$ is a length of the sequence.

26. The non-transitory computer readable medium according to claim 19, wherein the instructions further includes instructions for receiving the random access signal from the terminal device.

27. The non-transitory computer readable medium according to claim 19, wherein a code resource for the request signal is different from a code resource for the random access signal.

28. A system, comprising:
a terminal device; and
a network device;
wherein the network device is configured to send a first signal set to the terminal device;
wherein the terminal device is configured to receive the first signal set from the network device, wherein a number of the first signal set is one or more than one, and wherein the first signal set comprising a synchronization signal;
wherein the terminal device is configured to send a request signal to the network device according to the first signal set;
wherein the network device is configured to receive the request signal from the terminal device, the request signal requesting a second signal which carries at least one of cell reselection information, a neighboring cell list, notification information of an earthquake and tsunami warning (ETWS), or notification information of a common alert (CMAS), wherein a sequence length for the request signal is the same as a sequence length for a random access signal, and the request signal is associated with the first signal set;
wherein the network device is configured to send the second signal to the terminal device; and
wherein the terminal device is configured to receive the second signal from the network device.

29. The system according to claim 28, wherein the first signal set further comprises a broadcast signal.

30. The system according to claim 28, wherein a resource carrying the request signal is associated with the first signal set.

31. The system according to claim 28, wherein a reference signal received power (RSRP) of the synchronization signal in the first signal set exceeds a preset threshold.

32. The system according to claim 28, wherein the sequence length of the request signal is 139.

33. The system according to claim 28, wherein a sequence $x_u(n)$ for the request signal satisfies:

$$x_u(n) = e^{-j\frac{\pi u n(n+1)}{N_{ZC}}}, 0 \leq n \leq N_{ZC} - 1,$$

and wherein n is a sequence element index, u is a root sequence index, $N_{ZC}$ is a length of the sequence.

34. The system according to claim 28, wherein a code resource for the request signal is different from a code resource for the random access signal.

* * * * *

UNITED STATES PATENT AND TRADEMARK OFFICE
CERTIFICATE OF CORRECTION

PATENT NO. : 11,405,858 B2
APPLICATION NO. : 16/997431
DATED : August 2, 2022
INVENTOR(S) : Liu et al.

Page 1 of 3

It is certified that error appears in the above-identified patent and that said Letters Patent is hereby corrected as shown below:

In the Specification

In the Detailed Description of Illustrative Embodiments, Column 25, Lines 33-34; insert --and-- between "," and "where".

In the Detailed Description of Illustrative Embodiments, Column 26, Line 6; delete "k" and insert --*k*-- and delete "1" and insert --*l*--.

In the Detailed Description of Illustrative Embodiments, Column 29, Line 37; delete "0" and insert --O--.

In the Detailed Description of Illustrative Embodiments, Column 32, Line 38; delete "one 1" and insert --one1--.

In the Detailed Description of Illustrative Embodiments, Column 33, Lines 52-68; delete

"
TABLE 5

|  | First signal set | Second signal set |
| --- | --- | --- |
| Synchronization signal | M | O |
| System message |  | M |
| Broadcast signal | O | O |
| Measurement pilot signal | O | O |

" and insert

Signed and Sealed this
Sixth Day of September, 2022

Katherine Kelly Vidal
*Director of the United States Patent and Trademark Office*

--

|  | First signal set | Second signal set |
|---|---|---|
| Synchronization signal | M | O |
| System message |  | M |
| Broadcast signal | O | O |
| Measurement pilot signal | O | O |

--.

In the Detailed Description of Illustrative Embodiments, Column 38, Lines 18-50; delete

| NI DI | Root sequence u |
|---|---|
| 0 | 0 |
| 1 | 1 |
| 2 | 2 |
| 3 | 4 |
| 4 | 6 |
| 5 | 8 |
| 6 | 10 |
| 7 | 12 |
| 8 | 14 |
| 9 | 16 |
| 10 | 18 |
| 11 | 20 |
| 12 | 22 |
| 13 | 24 |
| 14 | 26 |
| 15 | 28 |
| 16 | 30 |
| 17 | 32 |
| 18 | 33 |
| 19 | 35 |
| 20 | 36 |
| 21 | 38 |
| 22 | 40 |
| 23 | 42 |
| 24 | 44 |
| 25 | 46 |
| 26 | 48 |
| 27 | 50 |
| 28 | 52 |
| 29 | 54 |
| 30 | 56 |
| 31 | 58 |
| 32 | 60 |
| 33 | 62 |
| 34 | 64 |
| 35 | 66 |

" and insert

| NI D1 | Root sequence u | NI D1 | Root sequence u |
|---|---|---|---|
| 0 | 0 | 18 | 33 |
| 1 | 1 | 19 | 35 |
| 2 | 2 | 20 | 36 |
| 3 | 4 | 21 | 38 |
| 4 | 6 | 22 | 40 |
| 5 | 8 | 23 | 42 |
| 6 | 10 | 24 | 44 |
| 7 | 12 | 25 | 46 |
| 8 | 14 | 26 | 48 |
| 9 | 16 | 27 | 50 |
| 10 | 18 | 28 | 52 |
| 11 | 20 | 29 | 54 |
| 12 | 22 | 30 | 56 |
| 13 | 24 | 31 | 58 |
| 14 | 26 | 32 | 60 |
| 15 | 28 | 33 | 62 |
| 16 | 30 | 34 | 64 |
| 17 | 32 | 35 | 66 |

--                                                                               --.

In the Detailed Description of Illustrative Embodiments, Column 40, Line 43; delete "(i)" and insert --(1)--.

In the Detailed Description of Illustrative Embodiments, Column 45, Line 64; delete "B0" and insert --B1--.